United States Patent [19]

Yasujima et al.

[11] Patent Number: 4,944,022

[45] Date of Patent: Jul. 24, 1990

[54] METHOD OF CREATING DICTIONARY FOR CHARACTER RECOGNITION

[75] Inventors: Kenji Yasujima, Yokohama; Masao Hashimoto, Tokyo, both of Japan

[73] Assignee: Ricoh Company, Ltd., Tokyo, Japan

[21] Appl. No.: 134,165

[22] Filed: Dec. 17, 1987

[30] Foreign Application Priority Data

Dec. 19, 1986 [JP] Japan .................. 61-302900

[51] Int. Cl.$^5$ ............................ G06K 9/62
[52] U.S. Cl. ........................ 382/14; 382/10; 382/13; 382/36
[58] Field of Search ............ 382/9, 10, 13-15, 382/30, 34, 36, 48, 61; 358/453, 462, 470

[56] References Cited

U.S. PATENT DOCUMENTS

| | | | |
|---|---|---|---|
| 4,009,467 | 2/1977 | Kodera et al. | 382/61 |
| 4,028,674 | 6/1977 | Chuang | 382/36 |
| 4,300,123 | 11/1981 | McMillin et al. | 382/61 |
| 4,514,622 | 4/1985 | Wevelsiep et al. | 382/36 |
| 4,633,507 | 12/1986 | Cannistra et al. | 382/61 |
| 4,742,556 | 5/1988 | Davis, Jr. et al. | 358/453 |

Primary Examiner—Leo H. Boudreau
Assistant Examiner—Jose L. Couso
Attorney, Agent, or Firm—Oblon, Spivak, McClelland, Maier & Neustadt

[57] ABSTRACT

A method of creating a dictionary for character recognition uses a document on which identical characters are aligned in a scanning direction and a mark indicating a size of a character line including the characters is positioned in the vicinity of the aligned characters. An image processing is carried out for dot patterns of the aligned characters, and one dot pattern to be registered in a dictionary is produced. Then, the produced dot pattern is registered in a dictionary together with a corresponding character code data.

19 Claims, 32 Drawing Sheets

FIG.6

| o | n | the cont | iment with | its older |
|---|---|---|---|---|
| e | n | to Japan | even more | than what |
| v | e | been to | western Eur | ope, but |
| i | | nfiunes, of | ten arrivin | g by way |
| d | | with peri | ods in whic | h the jap |
| | | unified, tr | iumphantly | asserted |
| n | d | qualitie | s. | |
| i | | gnores the | cast shado | ws of nah |

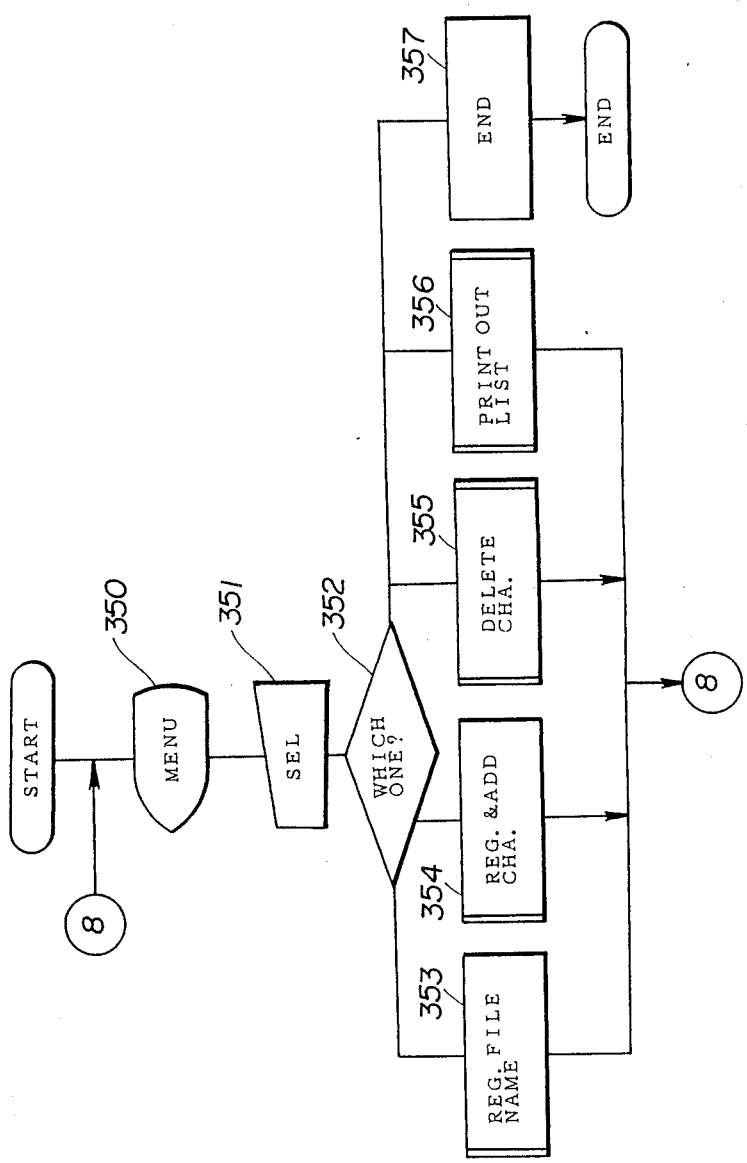
FIG.24 CREATE&MAINTE.HANDWRITTEN CHA. DIC.

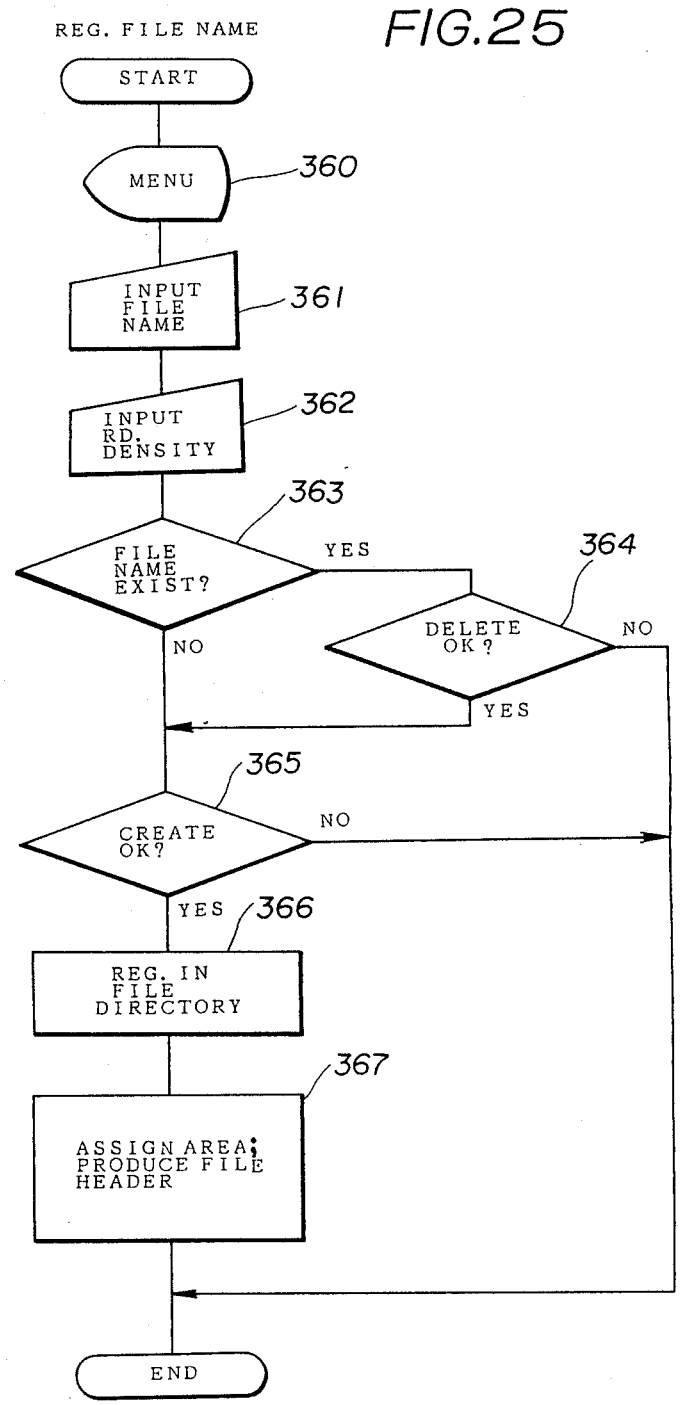

FIG.26A
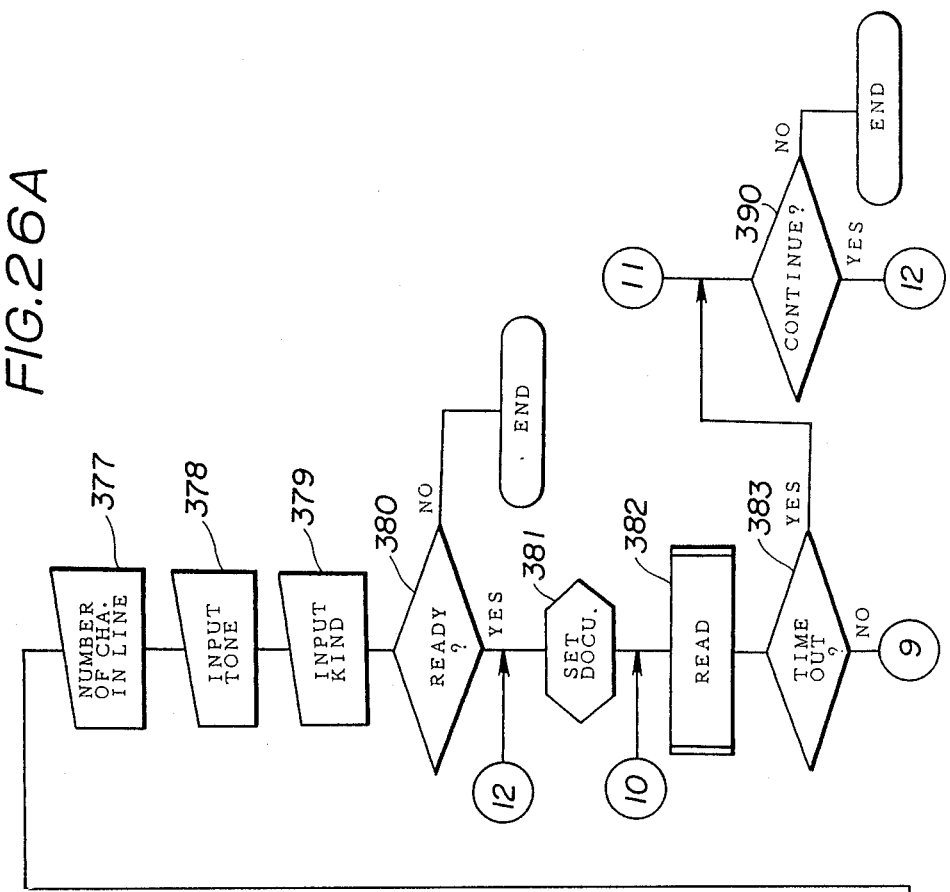
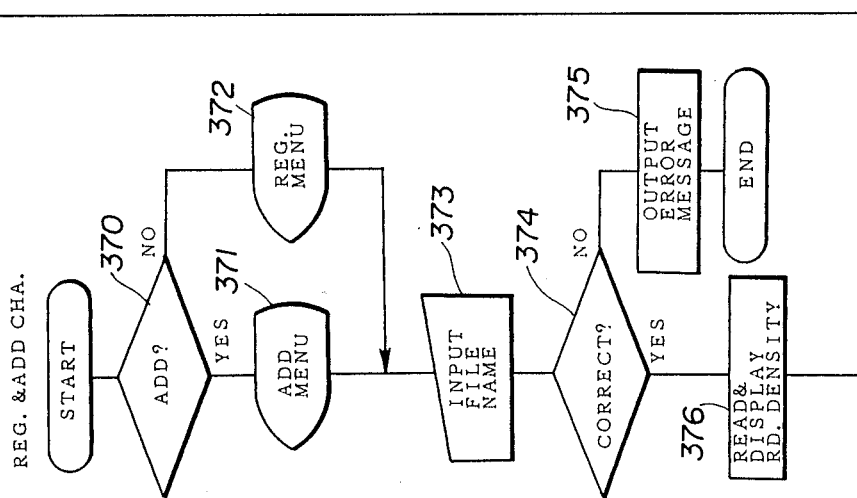

FIG.27
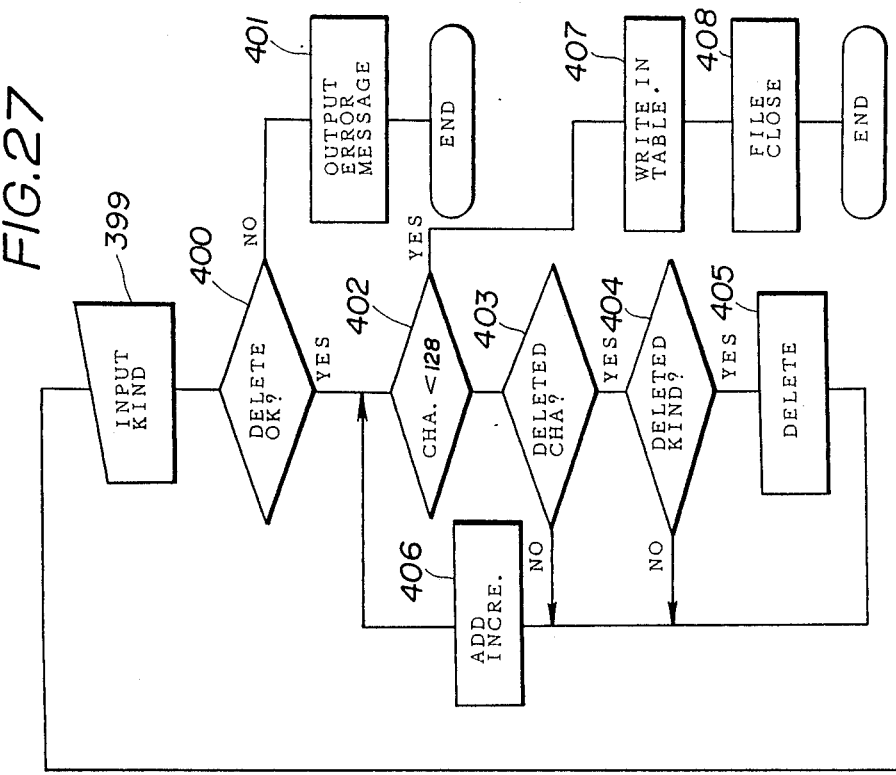
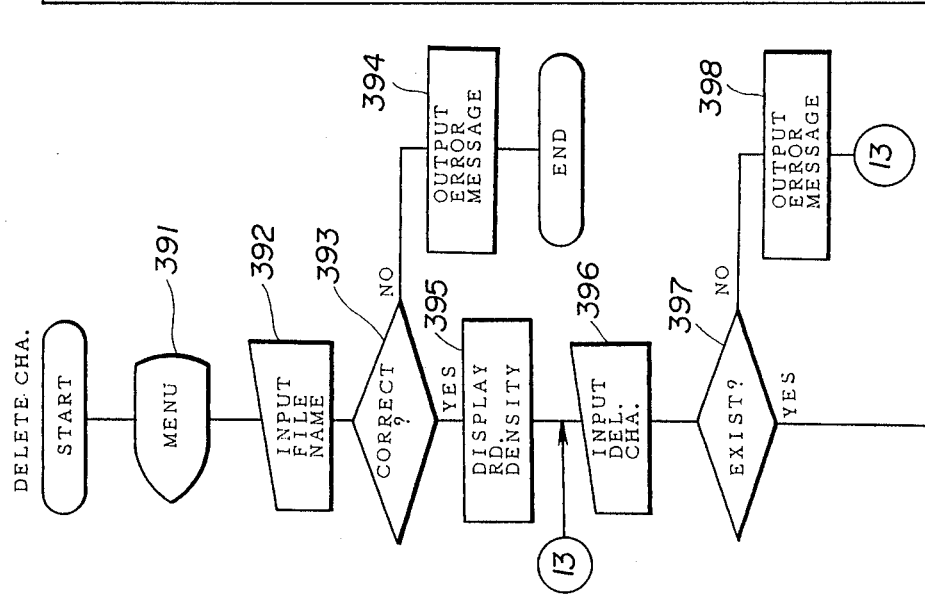

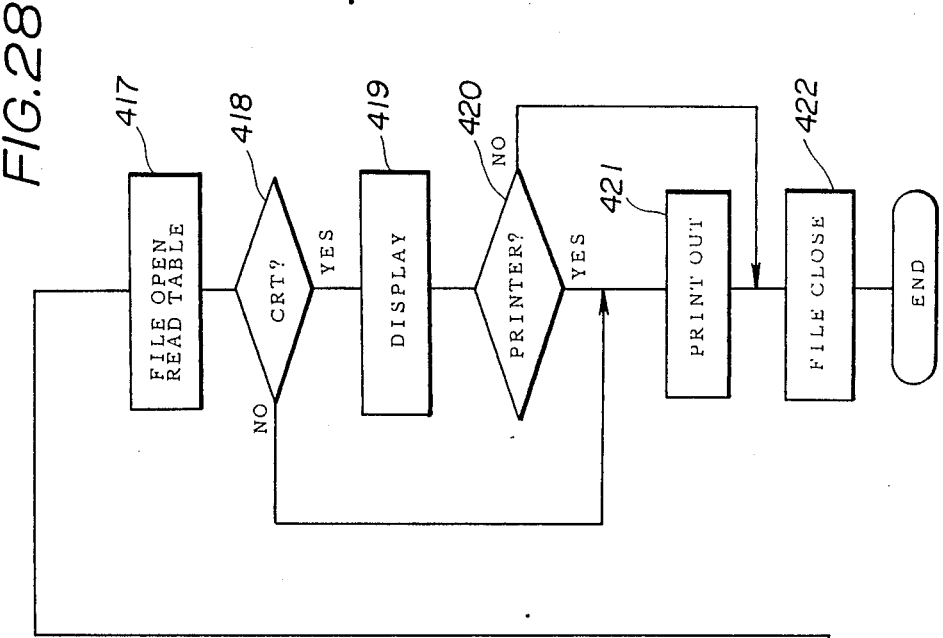
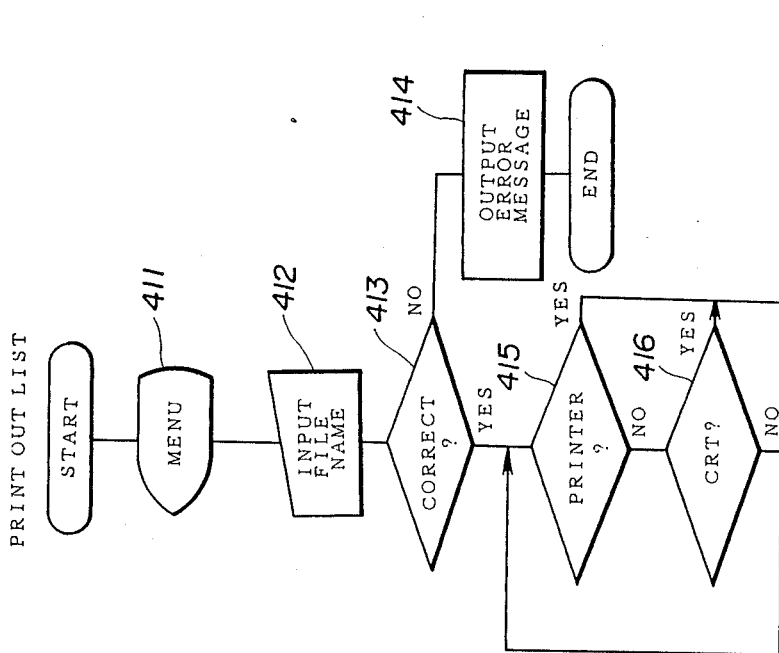
FIG.28

METHOD OF CREATING DICTIONARY FOR CHARACTER RECOGNITION

BACKGROUND OF THE INVENTION

The present invention generally relates to an optical character reader (hereafter simply referred to as OCR), and in particular to a dictionary creating method adapted to the OCR, for creating a dictionary which is used for recognizing an inputted unknown character.

Currently, various OCRs have been developed. In general, the OCR optically scans a document by use of an image scanner, and reads an image information from the document as image data. The image data may include printed or handwritten characters. Then, the OCR recognizes the unknown characters from the image data. Finally, the image data corresponding to the recognized characters are converted into character code data.

The OCR makes it possible to considerably improve efficiency in entering character information in the systems, as compared with a keyboard. Therefore, the OCR is suitable for input means for entering character information in character processing systems. For example, the OCR may be suitably applied to word processing systems, automatic translating systems, data sheet totalling systems and systems for producing data files. Also, the OCR may be suitably applied to communication systems such as data communication systems which transmit character data.

The OCR has a dictionary used for recognizing the inputted unknown character. In the dictionary, image data of each of known (reference) characters are pre-registered as reference image information. Image data of the unknown character is compared with image data of the reference characters registered in the dictionary. One reference character having the image data which matches with the image data of the unknown character is found. Then, the unknown character is identified as that reference character. Finally, the image data corresponding to the recognized or identified character is converted into character code data.

In general, many kinds of designs of type characters, or many kinds of character fonts are used. For this reason, the dictionary must be provided for each of the character fonts.

However, to create the dictionary or carry out maintenance of the created dictionary such as modifications or variations, it is necessary to use a tool specifically designed for creating and modifying or varying the dictionary. In other words, the OCR itself does not have such functions. For this reason, the creation and maintenance of the dictionary is very cumbersome.

In addition, the creation and maintenance of the dictionary for recognizing the handwritten characters is more cumbersome and complex due to many limitations regarding the dictionary creation.

SUMMARY OF THE INVENTION

Accordingly, a general object of the present invention is to provide a novel and useful method of creating a dictionary for character recognition in which the disadvantages have been eliminated.

A more specific object of the present invention is to provide a method of creating a dictionary for character recognition which can be implemented by a character recognition apparatus.

Another object of the present invention is to provide a method of creating a dictionary for character recognition which makes it possible to easily create the dictionary, even a dictionary for recognizing handwritten character.

Still another object of the present invention is to provide a method of creating a dictionary for character recognition capable of easily modifying or varying the dictionary.

The above objects of the present invention can be achieved by a method of creating a dictionary comprising the steps of optically scanning a document on which identical characters are aligned in a scanning direction and a mark indicating a size of a character line including the characters is positioned in the vicinity of the aligned characters; extracting image data of each of the characters within the line defined by the mark; carrying out a predetermined image processing for dot patterns formed by the image data of the characters to produce one dot pattern; entering a character code data corresponding to the produced dot pattern data; and registering the dot pattern and the character code data in a storage region for a dictionary file for character recognition.

Other objects and features of the present invention will become apparent from the following detailed description when read in conjunction with the following drawings.

BRIEF DESCRIPTION OF THE DRAWINGS

FIG. 6 is a view for explaining extraction of character lines;

FIG. 24 is a flow chart showing a process for creation and maintenance of a handwritten character dictionary;

FIG. 25 is a flow chart showing a process for registration of a handwritten character dictionary file name;

FIGS. 26A and 26B are flow charts showing a process for registration and addition of a character into a handwritten character dictionary;

FIG. 27 is a flow chart showing a process for deletion of a character from a handwritten character dictionary;

FIG. 28 is a flow chart showing a process for outputting a list of characters in a handwritten character dictionary;

DETAILED DESCRIPTION

Firstly, a description will be given on a processing system which has a function as the OCR and implements a dictionary creating method of the present invention.

Figure 1:
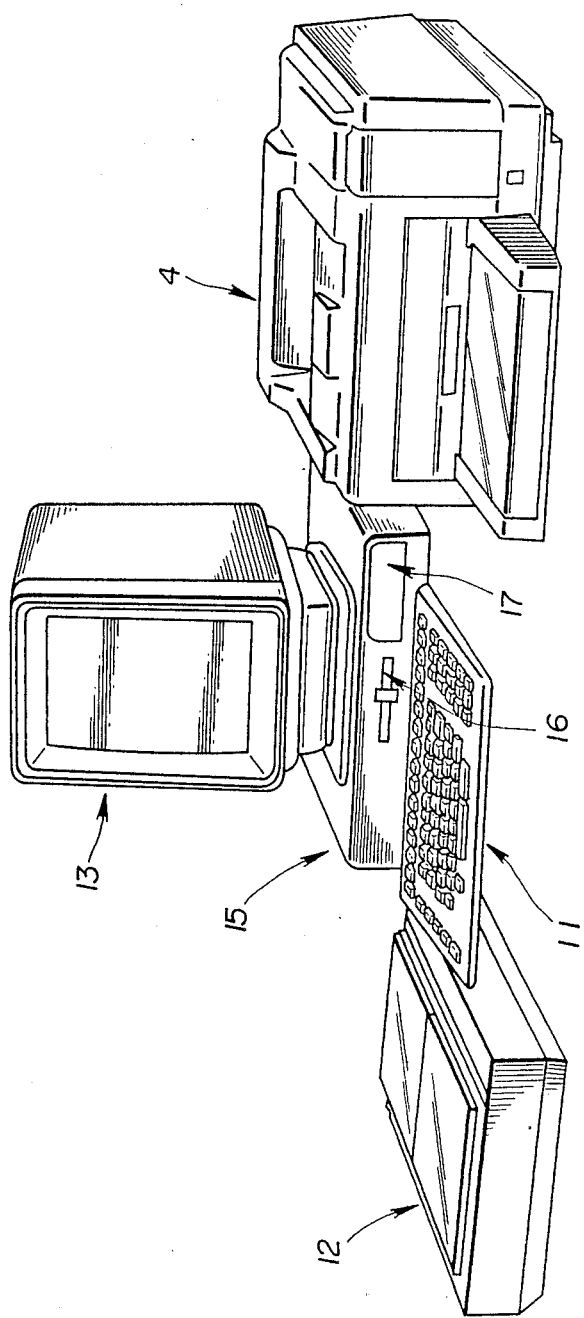
FIG. 1 is a perspective view of a processing system having a function of character recognition to which the present invention is applicable.

Referring to FIG. 1, a processing system has a keyboard 11 and an image scanner 12 as data input means. The keyboard 11 has character keys such as alphameric character keys and "kana (Japanese alphabets)" keys, cursor keys, a number of function keys and the like. The image scanner 12 optically scans a document and produces image information as image data.

As data output means, the system has a cathode ray tube display unit (hereafter simply referred to as CRT unit) 13 and a printer 14. The CRT unit 13 displays various images and characters including guidance to an operator. The printer 14 is used to print out various information processed in the system. A laser printer may be used for the printer 14.

Figure 2:
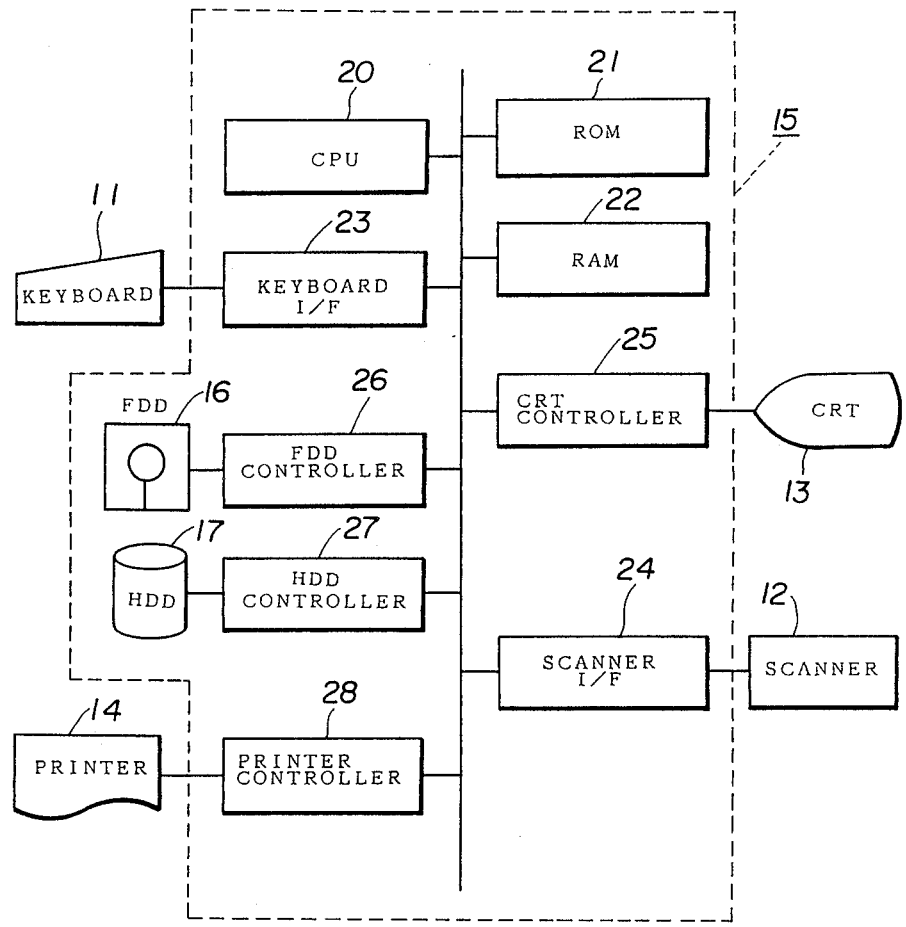
FIG. 2 is a block diagram of the processing system shown in FIG. 1.

A main processing unit 15 of the system contains a flopy disc drive unit (hereafter simply referred to as FDD) 16 and a hard disc drive unit (hereafter simply referred to as HDD) 17. In addition, as shown in FIG. 2, the main processing unit 15 comprises a controller (hereafter simply referred to as CPU) 20, a read only memory (hereafter simply referred to as ROM) 21, a random access memory (hereafter simply referred to as RAM) 22, a keyboard interface 23, a scanner interface 24, a CRT controller 25, a FDD controller 26, a HDD controller 27, and a printer controller 28.

The CPU 20 systematically controls the whole system in accordance with flow charts which will be described layer. The CPU 20 may be made up of a microcomputer. The RAM 22 is used to temporarily store the image data from the image scanner 12 and the dictionary read out from the FDD 16 or HDD 17.

The FDD 16 or HDD 17 is used to store various dictionaries and to temporarily store the image data from the scanner 12. In this example, the dictionaries are classified into two categories; one of which is associated with font dictionaries and the other is associated with handwritten character dictionaries. The font dictionaries are used to recognize the type characters each having a peculiar font, whereas the handwritten character dictionaries are used to recognize handwritten characters. A plurality of font dictionaries are provided for each of the fonts (various kinds of character designs). The font dictionaries provided for one font depend on a reading dot density at the time of the scanning. Likewise, a plurality of handwritten character dictionaries are provided depending on the reading dot density. Each of these dictionaries is stored as a dictionary file in the FDD 16 or HDD 17. Each file has a file header used to store various information such as a file number, a file name and so on. Further, all of the dictionary files are managed by a file directory storing various information such as the file name, a file address, a file size and so on.

Image data of the document read by the image scanner 12 is passed through the scanner controller 24 and is supplied to the main processing unit 15. The read image data may be directly transferred into the RAM 22 or once stored in an image data file which is formed in the FDD 16 or the HDD 17. Upon the character recognition, the image data read by the scanner 12 is transferred from the FDD 16 or HDD 17 in the RAM 22.

Before explaining the dictionary creating method of the present invention, basic functions of the system shown in FIGS. 1 and 2 are described to ensure the better understanding of the present invention.

Figure 3:
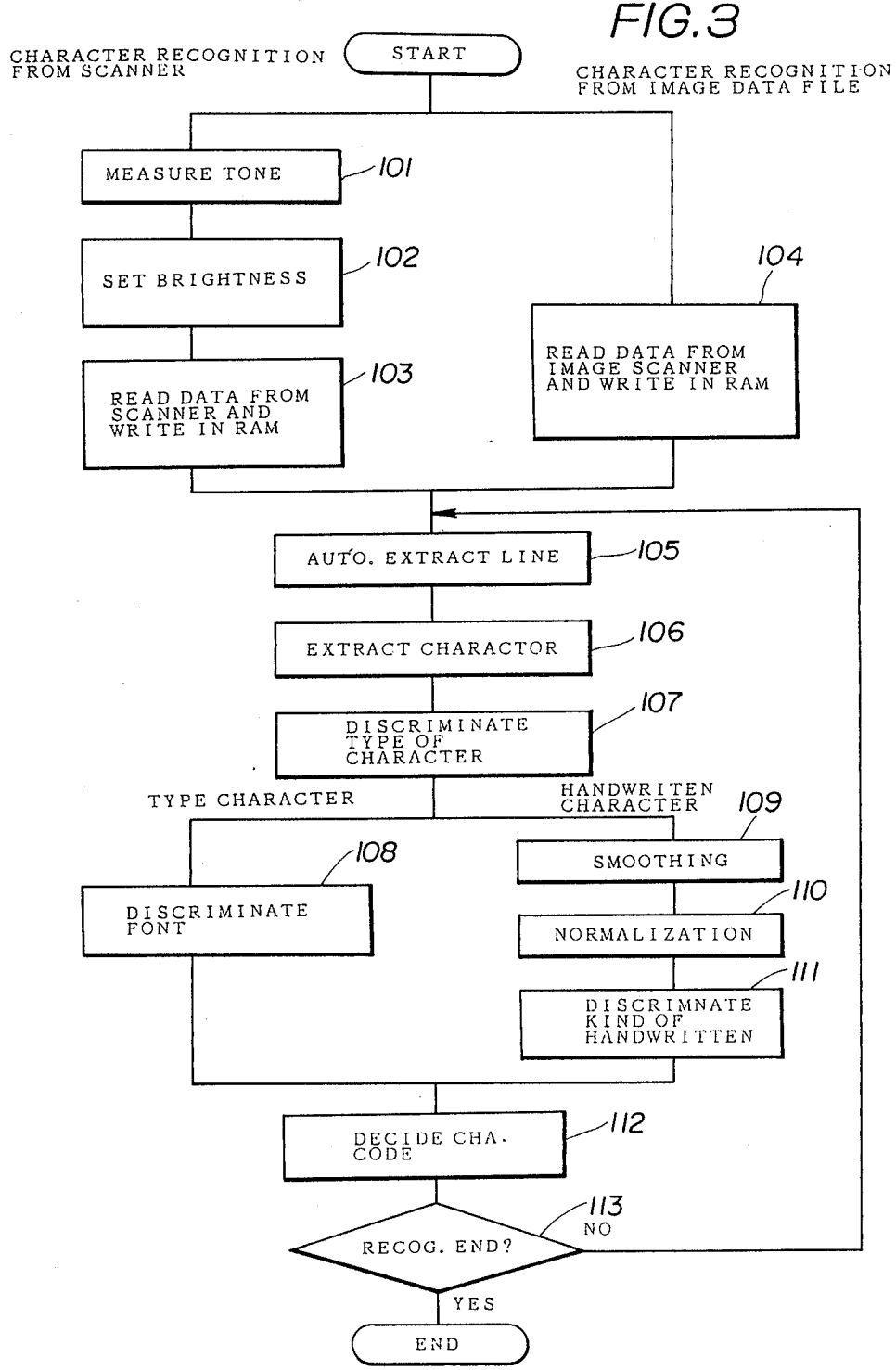
FIG. 3 is a flow chart of a character recognition process in the processing system shown in FIGS. 1 and 2.

Referring to FIG. 3 showing a basic process for recognizing the unknown character, when the image data read by the scanning is directly transferred into the RAM 22 and the character recognition is carried out therefor, a sequence of steps 101 to 103 is carried out. First of all, the system discriminates tone of the character on the document (step 101), and decides an optimum brightness of a fluorescence lamp for lighting up the document to be scanned in accordance with a discriminated result at step 101 (step 102). The tone of the character on the document may be manually designated by the operator through the keyboard 11, or may be automatically designated by partially scanning the document and detecting a level of the tone. The brightness of the lamp is made relatively dark in the case where the character on the document is relatively heavily written or printed, whereas the brightness is made relatively bright in the case where the document is relatively faintly written or printed. This brightness adjustment is aimed at accurately obtaining the image data of the characters on the document. Then, the scanner 12 optically scans the document with a designated reading dot density and provides the RAM 22 with the image data (step 103). The reading dot density will be explained in detail later.

Figure 4:
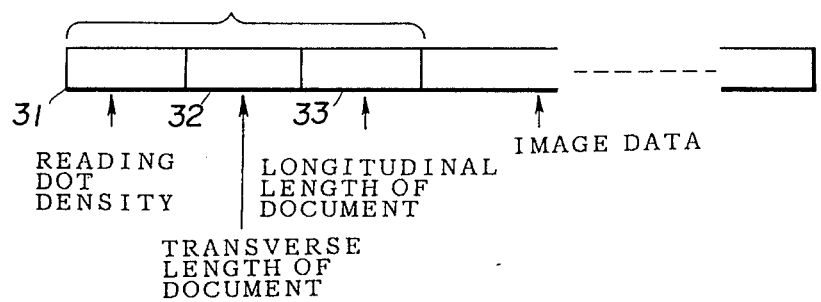
FIG. 4 is a view for explaining a file header added to an image data.

On the other hand, when carrying out the character recognition for the image data of the unknown characters stored in the FDD 16 or HDD 17, the image data is transferred therefrom into the RAM 22 (step 104). Of course, the image data stored therein is image data which is read by the scanner 12 and transferred. As shown in FIG. 4, the transferred image data is stored in an image data storing region of the image data file formed in the FDD 16 or the HDD 17. At this time, the following information is written into respective file header regions. That is, the reading dot density, a length of the document in the main (transverse) direction along which characters are written or printed, and a length of the document in the sub-scanning (longitudinal) direction are registered into header parts 31, 32 and 33, respectively. The reasons are explained later.

Subsequent to step 103 or 104, a sequence of steps 105 to 107 is carried out. Step 105 automatically extracts each of character lines from the image data stored in the RAM 22, and step 106 automatically extracts each of characters from each of the extracted character lines.

Figure 5B:
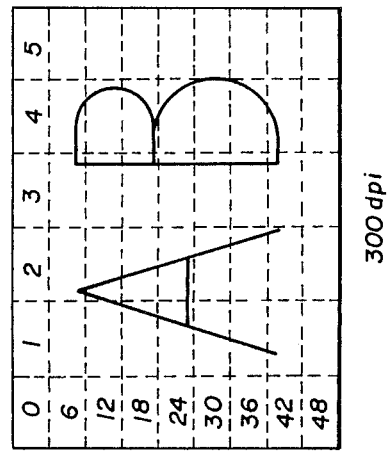
FIGS. 5A and 5B are views for explaining a reading dot density at the time of scanning.
Figure 5A:
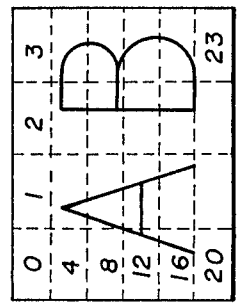

As shown in FIGS. 5A and 5B, the image data scanned by the scanner 12 is successively stored into the image storage region formed in the RAM 22 by one bite. Therefore, the length information of the document is necessary to extract each of the character lines and further each of the characters included in each of the extracted lines. In addition, the density of the image data is necessary to designate a dictionary having the reading dot density which is the same as that at the time of the scanning. FIG. 5A shows image data which is read with the reading dot density equal to 200 dpi (dots per inch), and FIG. 5B shows image data which is read with the reading density equal to 300 dpi. As can be seen from these figures, the size of the image data (dot pattern) of one character (height and width) depends on the reading dot density.

The character line extracting process at step 105 is carried out in accordance with a conventional horizontal projection method. This method detects a space between two adjacent lines and an area sandwiched between two neighboring spaces is determined to be one character line in which characters are aligned in the main direction. In this process, if the document is somewhat obliquely set to the image scanner 12, there is a possibility that the character line could not be extracted correctly. For example, the space between the adjacent two lines becomes narrower towards the right-hand side direction, and finally disappears. To eliminate this problem, one character line is divided into a plurality of line blocks so that the space separating two adjacent character lines can be ensured.

Figure 7:
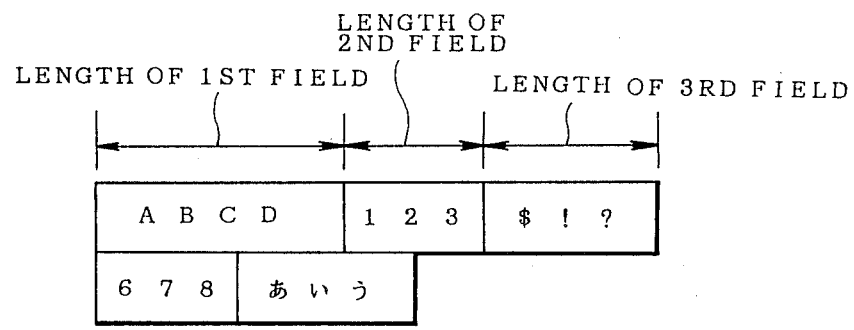
FIG. 7 is a view for explaining discrimination of handwritten characters.

Subsequent to step 106, a character type is detected at step 107. That is, it is checked whether the unknown characters are the handwritten character or the type character having the peculiar font. This discrimination may be carried out by predetermining fields on a document within which only the handwritten characters are acceptable. In other words, a document which has fixed fields for the handwritten characters is used. Of course, the system must have information regarding such document beforehand. For this purpose, as shown in FIG. 7, a length of each field is pre-registered in the FDD 16 or HDD 17. Preferably, a specific kind of handwritten characters are assigned to respective fields. In the illustrated example, the first, second and third fields accept Roman alphabets, Arabic figures and various symbols. Thereby, it is possible to improve the recognition rate of the handwritten characters and the recognition speed.

Subsequent to step 107, either step 108 or 109 is carried out depending on the character type. When the unknown character is the type character, step 108 is executed. At step 108, the the font of the unknown character is discriminated in order to designate the optimum dictionary. As mentioned previously, various font dictionaries are prepared depending on the font and the reading dot density. Thereafter, a character code corresponding to the recognized character is decided by use of the designated font dictionary (step 112). This process will be explained in detail later.

On the other hand, when the unknown character is found to be the handwritten character at step 107, the process proceeds to step 109 at which a smoothing process is carried out for the image data. The smoothing process intends to compensate a rough contour of the dot pattern of the handwritten character. Then, at step 110, a normalization process for making the size of the dot pattern uniform is carried out. Thereafter, at step 111, the kind of the handwritten character is discriminated by use of the information of the length of each field and relative kind of the handwritten character. If the handwritten character is the Roman alphabet, the relative handwritten character dictionary is selected. Then, the matching process is carried out and the character code corresponding to the recognized handwritten character is decided (step 112). Finally, it is checked whether or not the character recognition process is completed. If the discrimination result is affirmative, the process for one character line is completed. Alternatively, if not, the process returns to step 105 and the character recognition process for the next character line is carried out in the manner mentioned above.

Figure 8:
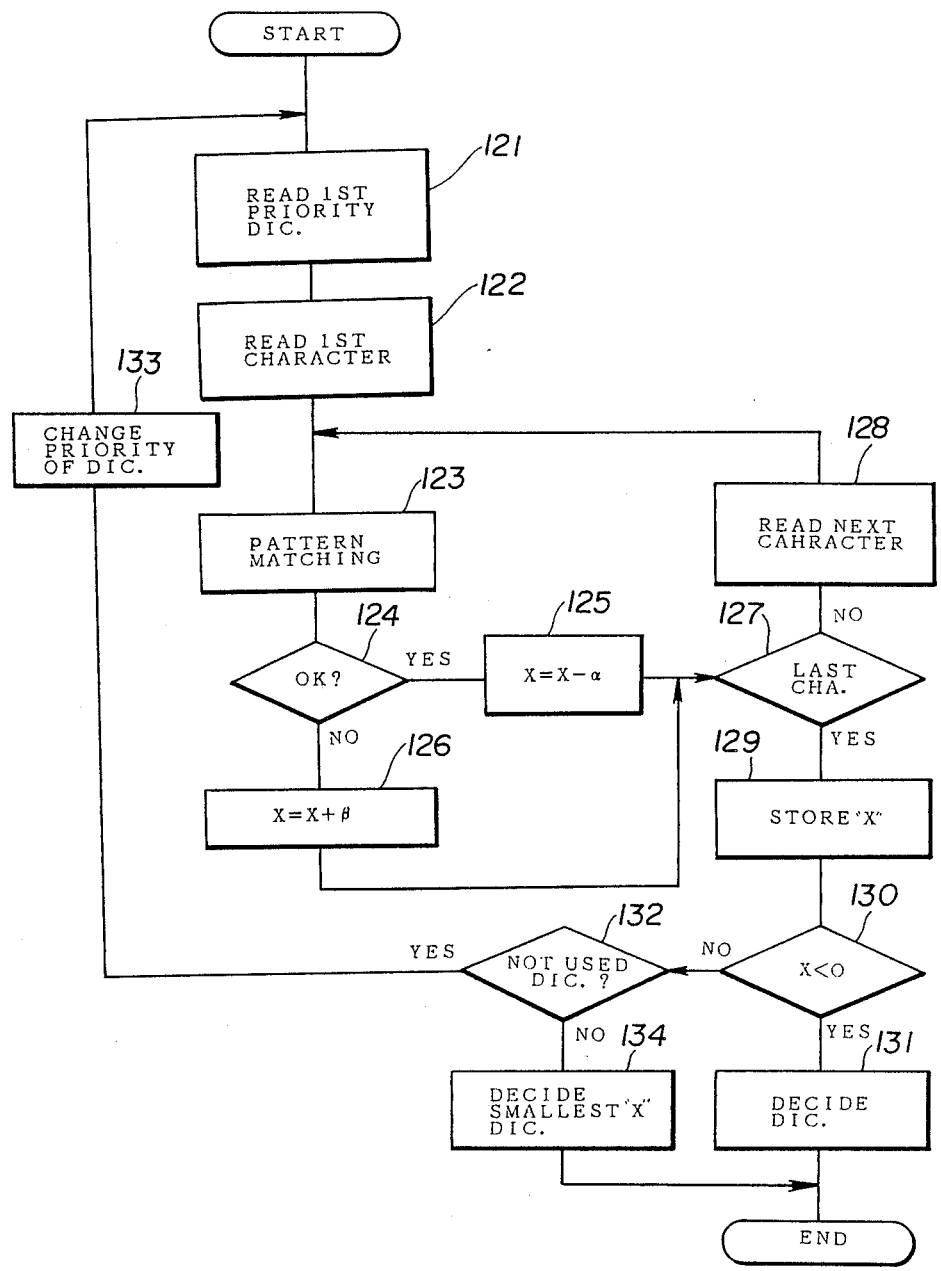
FIG. 8 is a flow chart showing a process for designating one optimum font dictionary.
Figure 9:
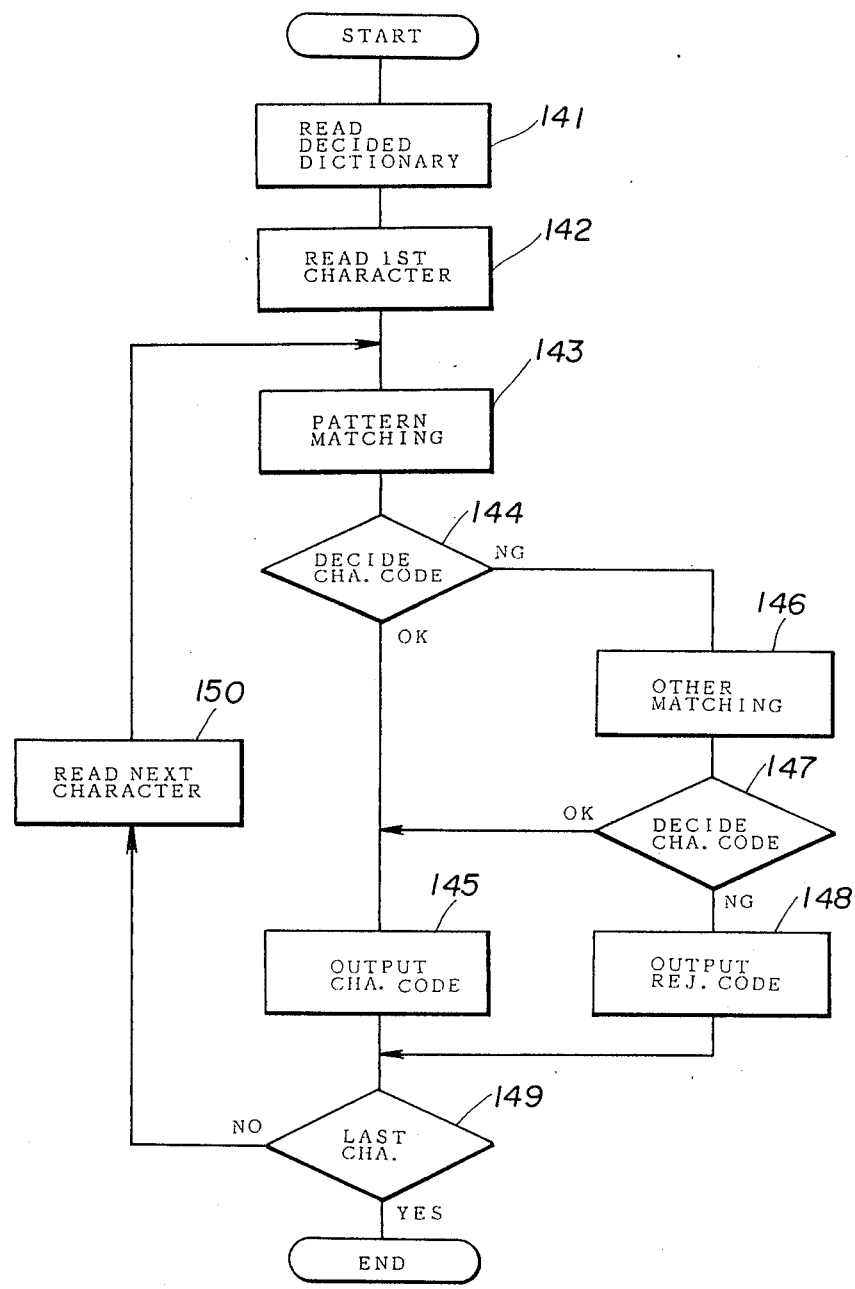
FIG. 9 is a flow chart showing a process for a pattern matching.

An explanation of steps 108 and 112 in FIG. 3 is given in more detail, by referring to FIGS. 8 and 9.

FIG. 8 shows a detailed sequence of the character font discriminating process at step 108. As described previously, the font dictionaries are provided for each of the character fonts. And the font dictionaries for the same font are provided depending on the reading dot density. Therefore, with respect to the unknown type characters to be recognized, it is necessary to designate the optimum dictionary. The designation may be manually made or automatically made. In order to achieve the automatic dictionary designation, the priority is assigned to the font dictionaries.

It is now assumed that the three different font dictionaries #A, #B and #C having the same reading dot density are provided and variable priority levels are assigned to these dictionaries, as shown in TABLE-I.

TABLE 1

|  | #A | #B | #C |
| --- | --- | --- | --- |
| 1st matching | 1 | 2 | 3 |
| 2nd matching | 3 | 1 | 2 |
| 3rd matching | 2 | 3 | 1 |

The optimum font dictionary is designated as follows. Firstly, the matching at step 112 is made with the dictionary of the highest priority level. In the above example, the font dictionary #A is selected. If a matching result is less than a predetermined threshold level, the dictionary #A is found to be unsuitable for the unknown characters to be registered. This means that the font of the dictionary #A matches with that of the unknown characters. Adversely, if the matching result exceeds the threshold level, the dictionary #A is concluded to be the unsuitable dictionary, and the priority levels assigned to the dictionaries #B and #C which are lower than the priority of the dictionary #A upon the first matching are respectively advanced by 1 as shown in the above table. At this time, the lowest priority level is assigned to the dictionary #A. Thereafter, matching with the dictionary #B which is the highest priority level at the time of the second matching is made. In this manner, the matching is repeated until the optimum dictionary is found. However, if all of the matching results are less than the threshold level, one dictionary having the best matching result is designated.

Generally, one document is printed with the the same character font. Therefore, once the optimum font dictionary is automatically designated by use of the priority, the subsequent matching process can be made at an extremely high speed.

A more detailed description of the character font discriminating process at step 108 is given with reference to FIG. 8. Firstly, the dictionary having the highest priority level (dictionary #A in the above example) is read from the RAM 22 (step 121) and a first unknown character positioned at the beginning of the character line is read from the RAM 22 (step 122). Next, the pattern matching (or feature matching) therebetween is made (step 123). If the matching is successful and the first unknown character can be identified (step 124), a predetermined constant value $\alpha$ is subtracted from a value X in a register provided in the CPU 20, for example (step 125). A value 0 in the register is initially set in the register. The value X in the register is reset to 0 every time the character at the beginning of one character line is read at step 122. If the matching is found to be unsuccessful at step 124, a predetermined constant value $\beta$ is added to the value X in the register (step 126). Then, it is checked whether or not the current unknown character is the last character of the character line (step 127). If the discrimination result at step 127 is negative, the next unknown character is selected (step 128) and the process returns to step 123, so that the same sequence is repeated. Adversely, if the current unknown character is found to be the last character of the line (step 127), the current value X in the register is stored in a storage area formed in the CPU 20 (step 129). Then, it is checked whether or not the value X is smaller than a threshold value 0 (step 130). If the result at step 130 is negative, it is checked whether or not there is any dictionary which has not been yet used (step 132). If the result at step 132 is affirmative, the priority assigned to the dictionaries are reorganized (step 133). In the above example, the priority levels at the second matching shown in TABLE-I are assigned. Then, the process returns to step 121, at which the dictionary of the highest priority (dictionary #B in the above example) is selected. Then, the matching with the characters of the same line is made again. After the matching of the last character with the current dictionary (dictionary #B) is made, if the value X stored at step 129 is smaller than 0 at step 130, this dictionary is designated as the optimum dictionary (step 131). Alternatively, if the result at step 130 is negative again, it is checked whether or not there is still any dictionary which has not been yet used for the matching (step 132). If the result at step 132 is affirmative, the priority is reorganized again (step 133). In the above example, the priority levels are altered as in the third matching process shown in TABLE-I. Then, the dictionary of the highest priority (dictionary #C)is selected (step 121), and the same matching process is repeated. Then, if the result at step 130 is negative again and it is found that there is no dictionary which has not been yet used. Thus, the dictionary having the smallest X value is designated (step 134).

A more detailed explanation of the character code deciding process at step 112 in FIG. 3 is given by referring to FIG. 9.

Firstly, the dictionary designated by the character font discrimination process at step 108 in FIG. 3 is read out from the HDD 17 and transferred into the RAM 22 (step 141 in FIG. 9). In this case, when the result at step 130 in FIG. 8 is affirmative and the optimum dictionary is designated at step 131, this optimum dictionary has been already stored in the RAM 22. Therefore, step 141 in FIG. 9 is omitted.

Next, the first unknown character of one character line is read from the RAM 22 (step 142). Then, the pattern matching is carried out (step 143) in accordance with a predetermined pattern matching method (a 24-dimensional mathcing method, for example). If the matching is successful and the corresponding character code can be decided (step 144), the character code is outputted (step 145). Adversely, if the pattern matching is concluded to be unsuccessful (step 144), the process proceeds to step 146, at which the matching is made in accordance with other pattern matching methods. In this example, there are provided a 4×4×8 dimensional matching method, a 3×3×8 dimensional matching method and a matching method based on multi-layer directional histogram. Thereafter, it is checked whether or not the character code can be found (step 147). If the result at step 147 is affirmative, the corresponding character code is outputted (step 145). Alternatively, if the result at step 147 is negative, a rejection code is produced (step 148). This code indicates that the identification of the unknown character is impossible. Then, step 149 is carried out, at which it is checked whether or not the unknown character designated at step 142 is the last character of the same line (step 149). If the result at step 149 is affirmative, the character code deciding process for one character line is completed. Alternatively, if not, the process proceeds to step 150, at which the next character is read out from the RAM 22. Then, the same process is repeated.

In this manner, the character font discriminating process and the character code deciding process are carried out per character line. Then, the recognized characters are displayed on the CRT display unit 13 or printed out by the printer 14. The rejection for the character which could not be recognized is displayed or printed out by a special symbol.

As described above, the character font cn be automatically found and the optimum font dictionary can be automatically designated. Hereafter, this function is referred to as "multi-font".

On the other hand, the step of discriminating the kind of the handwritten characters and the step of deciding the character code may be carried out in a similar way to the processes for the type character. However, in this case, the information relating to the length of the fields and the kind of the handwritten characters in the fields, which are described with reference to FIG. 7, is used.

A description will be given on a dictionary creating process and a dictionary maintenance process of the present invention.

Figure 10:
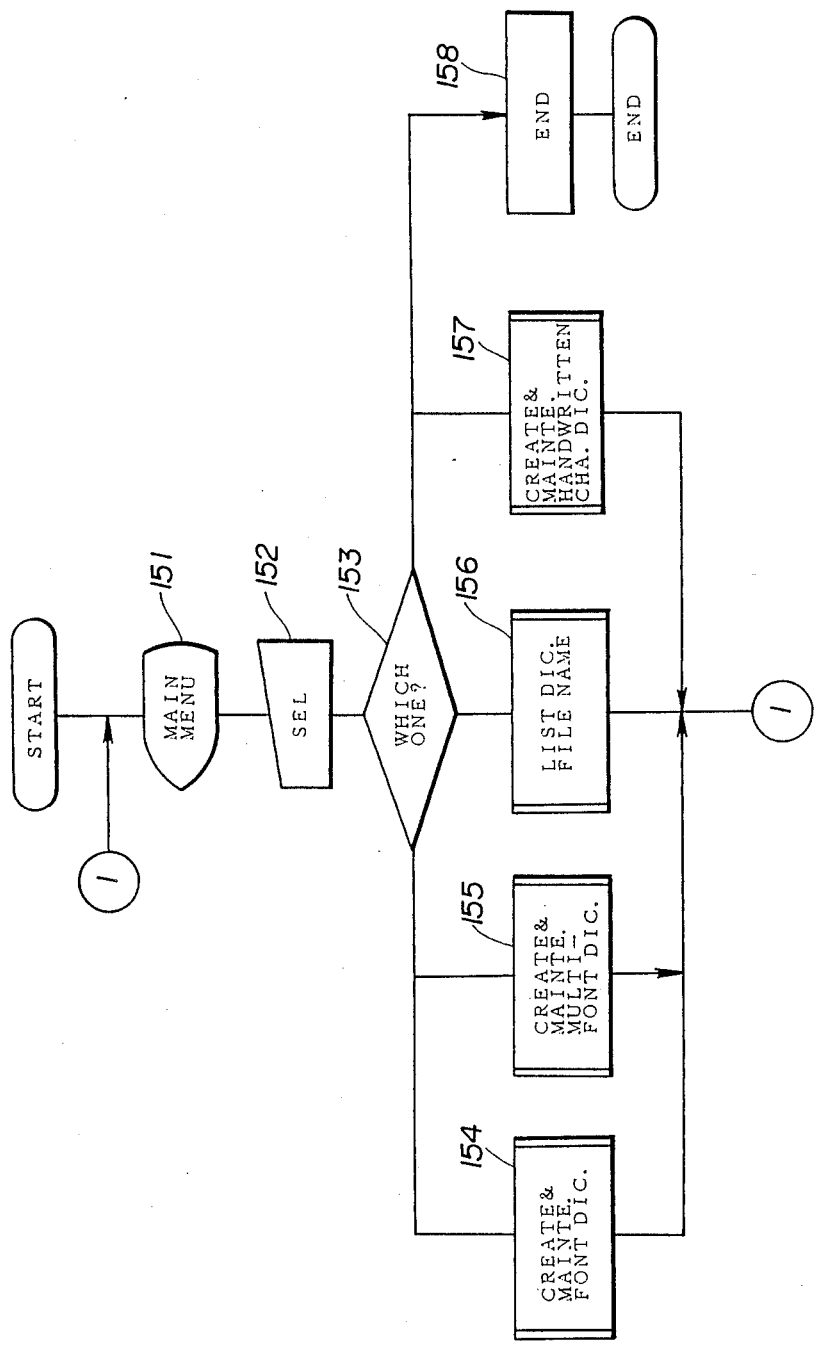
FIG. 10 is a flow chart showing a process for creation and maintenance showing a dictionary.

When the dictionary creating and maintenance process is designated through the keyboard 11, the system begins a process for selecting utilities (modes) shown in FIG. 10. Firstly, a main menu indicating the kinds of the processes which are prepared as utilities is displayed on the CRT unit 13 (step 151 in FIG. 10). Then, when the operator selects any one of the display processes (step 152), the selected process is discriminated (step 153) and carried out. In this example, there are prepared the following four utilities: "creation and maintenance of font dictionary", "creation and maintenance of multi-font dictionary", "outputting list of dictionary file name", and "creation and maintenance of handwritten character dictionary".

A description will be given on the utility of "creation and maintenance of font dictionary".

As described in the foregoing, the font dictionary is prepared for each of the character fonts and each of the dot densities. In the above example shown in TABLE-I, three font dictionaries #A, #B and #C are prepared for different fonts. These dictionaries are associated with the same dot density. The utility of "creation and maintenance of font dictionary" is used for creating and modifying or varying the font dictionaries.

Figure 11:
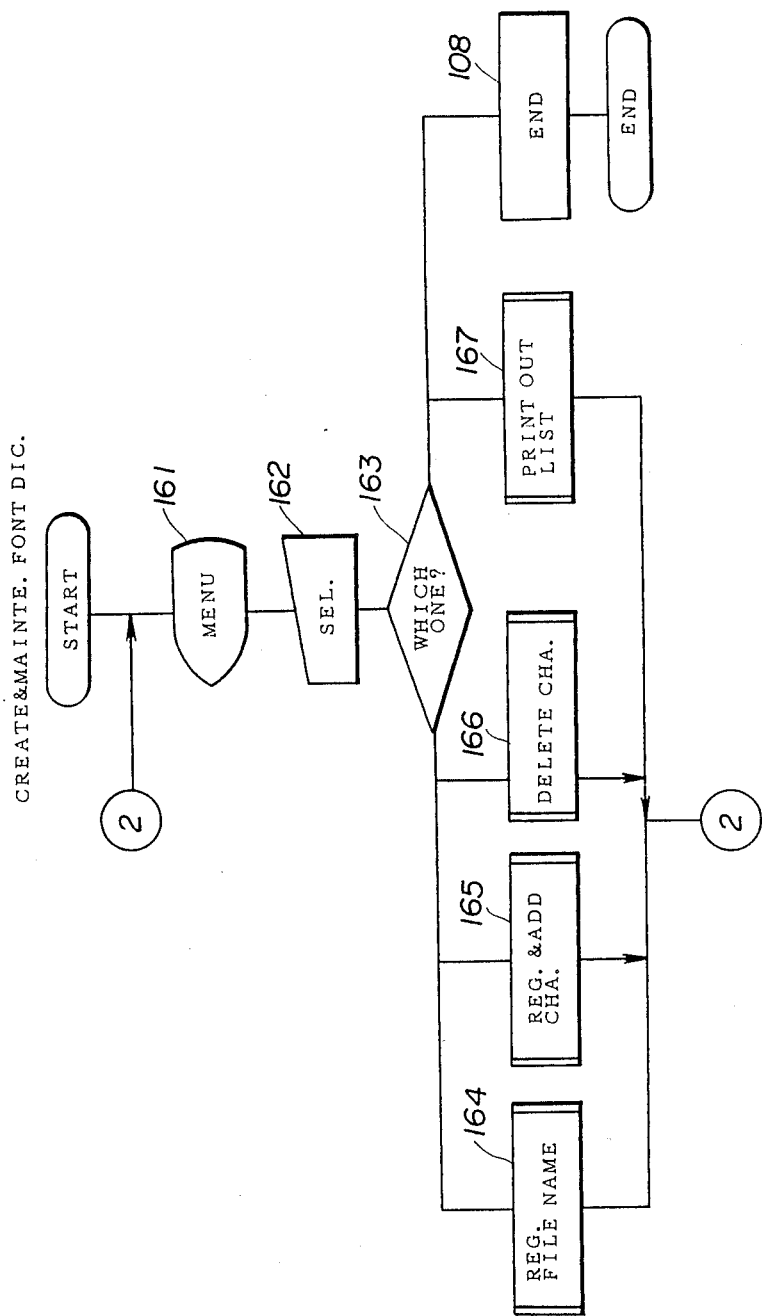
FIG. 11 is a flow chart showing a process for creation and maintenance of a font dictionary.

This utility has the following four sub-mode as shown in FIG. 11: "registration of file name", "registration and addition of character", "deletion of character", and "printing out list of registered character". When the utility of "creation and maintenance of font dictionary" is selected at step 152 in FIG. 10, a menu of this utility is displayed (step 161). Next when any one of the processes is designated by the key input (step 162), the selected process is discriminated (step 163).

Figure 12:
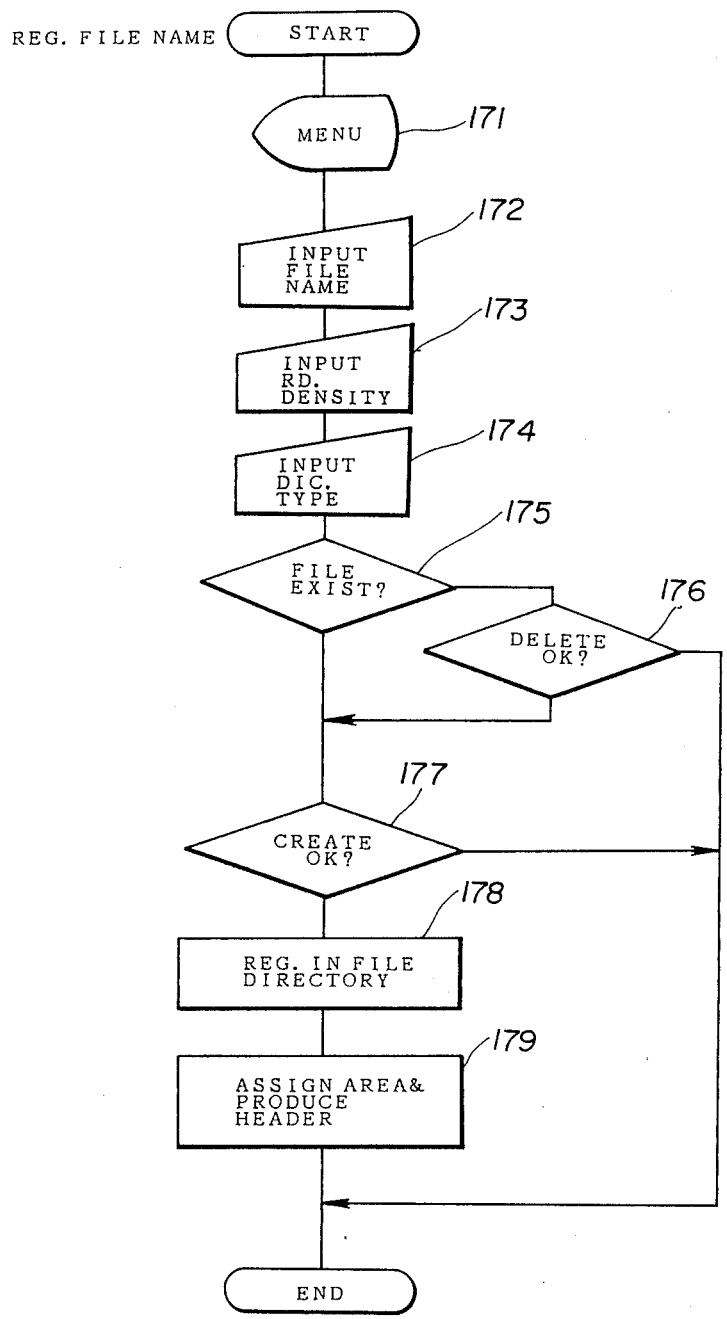
FIG. 12 is a flow chart showing a process for registration of a file name.

The process 164 of "registration of file name" is shown in FIG. 12. Firstly, a menu of this mode is displayed (step 171). Then, a font dictionary file name is entered by the operator (step 172). Subsequently, a number corresponding to a relative reading dot density and a number corresponding to a relative dictionary type are entered (steps 173 and 174). The dictionary type number depends on the fonts. Thereafter, it is checked whether or not the designated file name exists in the system (step 175). If the result at step 175 is affirmative, it is checked whether or not the font dictionary file designated by the entered file name is permitted to be deleted (step 176). If the deletion is not permitted, the process ends. Alternatively, if the deletion is permitted, it is checked whether or not the creation of the dictionary is permitted (step 177). If the result at step 177 is negative, the process ends. If the creation of the dictionary is permitted, the entered file name is registered in the file directory (step 178). Then, the storage region for storing the font dictionary file is assigned and the file header which is used to store control information such as addresses of the assigned storage region and the like is produced (step 179).

Figure 13A:
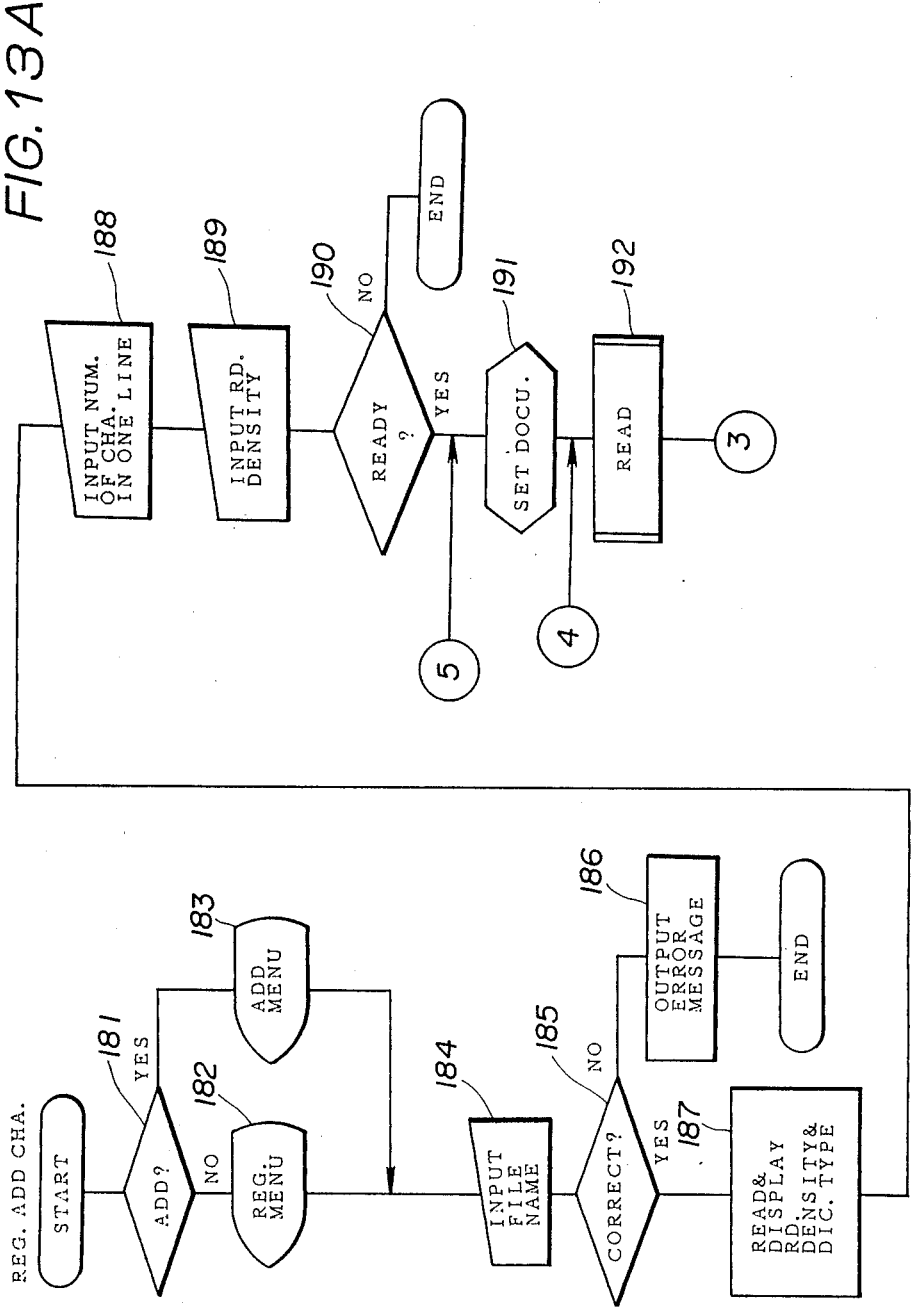
FIGS. 13A and 13B are flow charts showing a process for registration and addition of a type character.
Figure 13B:
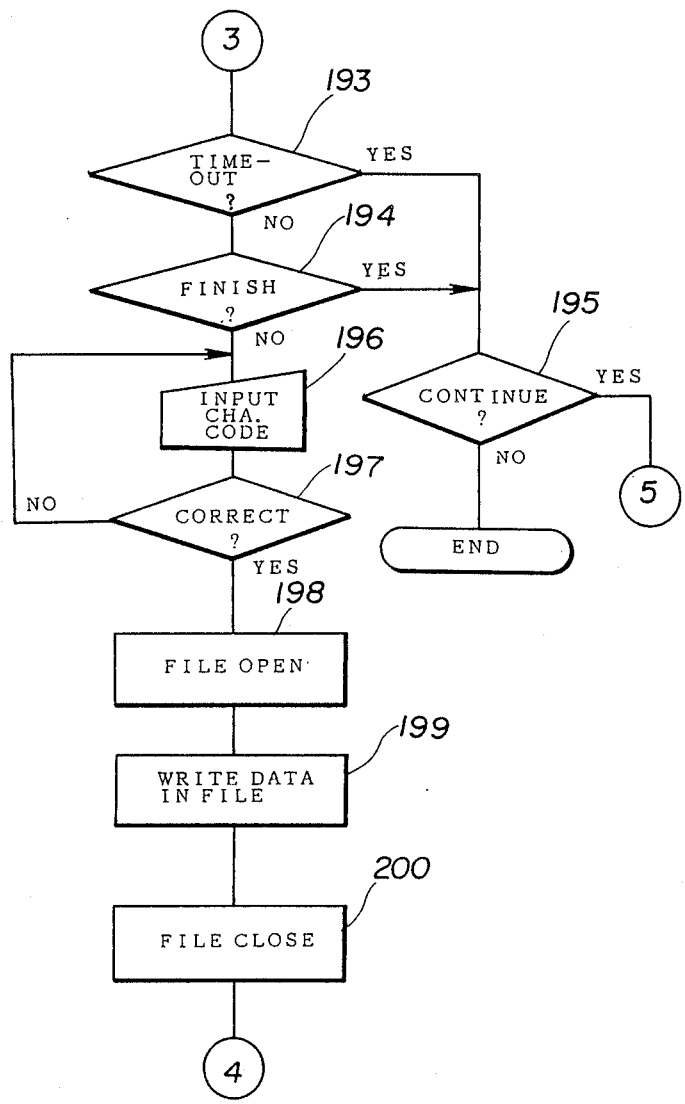

FIGS. 13A and 13B are flow charts showing the "registration and addition of character" mode (process 165 in FIG. 11).

At the commencement of this process, it is checked whether or not the addition of the character is designated (step 181). If the addition of the character is designated, a menu of the character addition is displayed (step 183). If not, a menu of the character registration is displayed (step 182). Then, a file name is inputted by the key input (step 184). Then it is checked whether or not the entered file name is correct (step 185). If the file name is incorrect, an error message is outputted (step 186) and the process ends. Adversely, if the file name is correct, the reading dot density and the dictionary type relating to the dictionary designated by the entered file name are read out from the file and displayed (step 187). Then, the number of characters which are the identical characters and aligned in the main (transverse) direction is entered (step 188). As decribed in detail later, the aligned identical characters are the character which the operator intends to register in the dictionary file. Subsequent to step 188, the tone of the characters is entered through the keyboard (step 189). Thereafter, it is checked whether or not the scanning is ready (step 190). If the result is negative, the process ends. Alternatively, if the result is affirmative, the document having the aligned identical characters is held in place (step 191). Then, the scanning of the document starts (step 192). Subsequently, it is checked whether or not the scanner 12 is in the time-out (step 193). If the result is affirmative, it is further checked whether or not the process should be continued (step 195). If the result is negative, the process ends. Alternatively, if the result at step 195 is affirmative, the process returns to step 191. On the other hand, if the result at step 193 is negative, it is checked whether or not the reading of the document has been finished (step 194). If the result is affirmative, the process proceeds to step 195. Adversely, if the result at step 194 is negative, the process proceeds to step 196.

At this time, the CPU 20 carries out an image processing for the dot pattern of each of the characters to produce one dot pattern to be registered in the font dictionary. The image processing will be described in more detail later. Then, the dot pattern produced by the image processing is displayed on the CRT unit 13. Instead, the dot pattern of any one of the extracted characters may be displayed. Then, the character corresponding to the displayed character pattern is entered through the keyboard 11 (step 196). Then, the system requests the confirmation of the operation at step 196 (step 197). If the operation at step 196 is confirmed to be correct, the font dictionary file is made open (step 198). Then, the image data produced by the above image processing and the corresponding character code entered at step 196 are written in the font dictionary file (step 199). Then, the file is closed (step 200).

Figure 14:
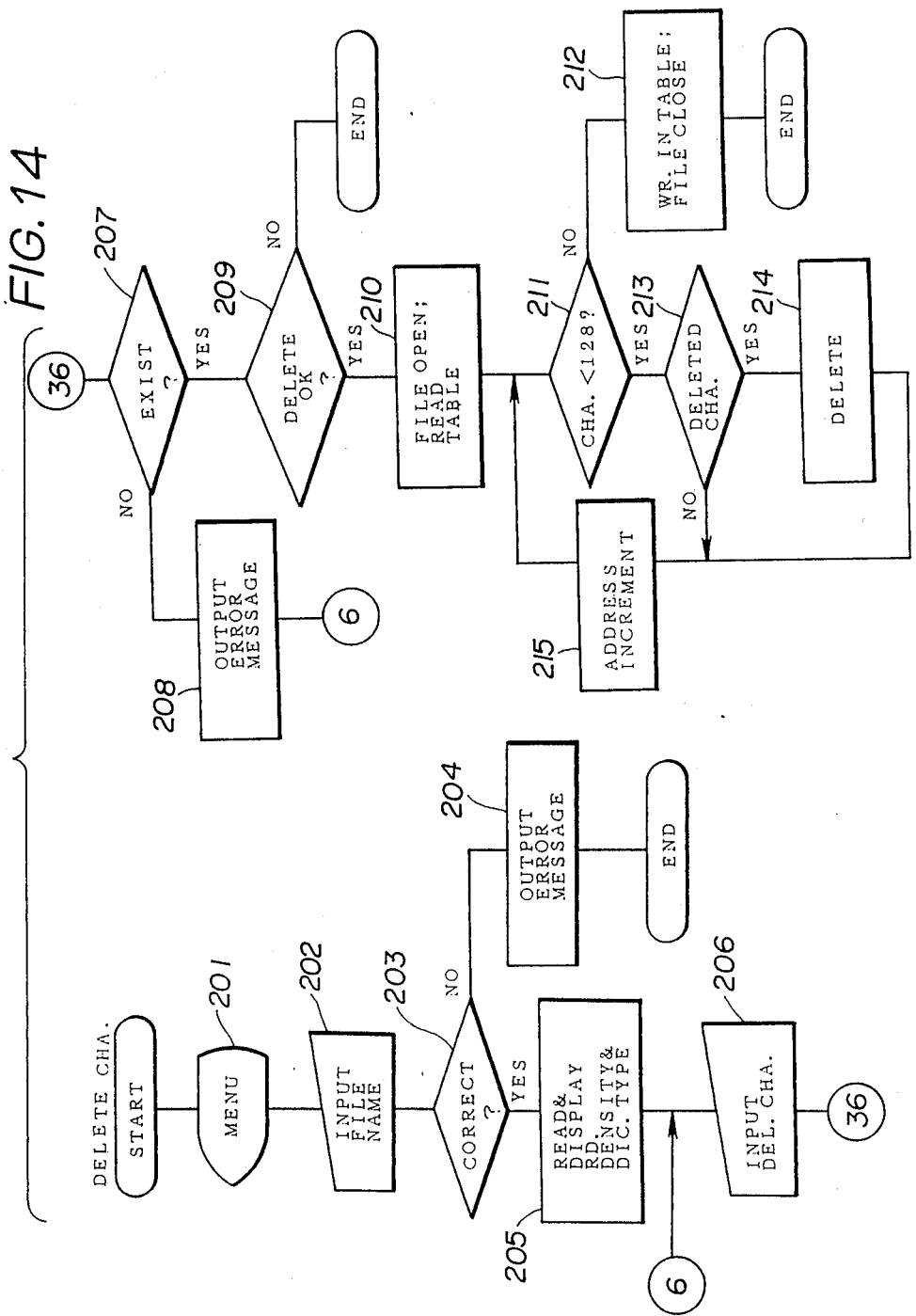
FIG. 14 is a flow chart showing a process for deletion of a type character.

FIG. 14 is a flow chart of the process 166 (FIG. 11) of deleting the character in the font dictionary file. Firstly, a menu for the deletion of the character is displayed on the CRT unit 13 (step 201). Next, the file name in which a character to be deleted exists is entered (step 202). The system asks the operator whether or not the enetered file name is correct through the CRT unit 13 (step 203). If the result at step 203 is negative, an error message is outputted (step 204) and the character deleting process ends. Alternatively, if the result at step 203 is affirmative, the reading dot density and the dictionary type is read out from the file (step 205). Then, these data are displayed on the CRT 13 unit (step 205). Thereafter, the character to be deleted is entered through the keyboard 11 (step 206). Then it is checked whether or not the entered character exists in the designated file (step 207). If the result at step 207 is negative, an error message is outputted (step 208) and the character deleting process ends. On the other hand, if the character to be deleted exists, it is checked whether or not the deletion is permitted (step 209). If the result at step 209 is negative, the process ends. Adversely if the result at step 209 is affirmative, the file is made open and a table in which the reference characters are registered are read and transferred in the RAM 22 (step 211). In this embodiment, 128 characters may be registered in the table. The 128 characters are sequentially read out and displayed. Every time one character is read out, it is checked whether or not the read character is the character to be deleted (step 213). If the result at step 213 is affirmative, the character in the RAM 22 is deleted (step 214). Thereafter, the address of the table is incremented (step 215) and the next character is checked. In this manner, the character designated at step 206 is deleted. Then, if all the characters in the table are checked (step 211), the contents of the RAM 22 is transferred to the HDD 17 and the table is revised. Then the process ends (step 212).

Figure 15:
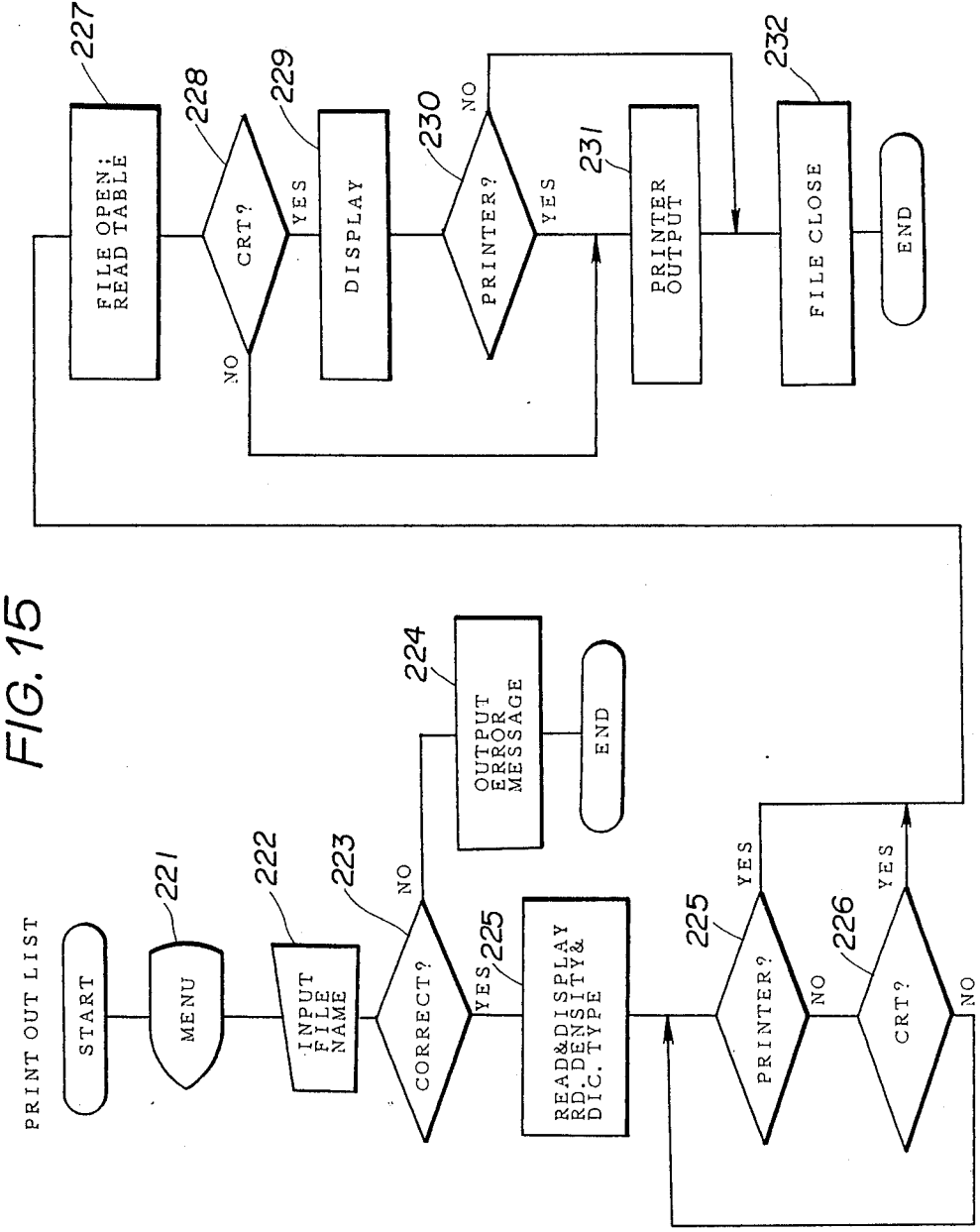
FIG. 15 is a flow chart showing a process for printing out a list of registered type character.

FIG. 15 is a flow chart of the process 167 (FIG. 11) for printing out a list of the characters registered in the font dictionary. First of all, a menu of this process is displayed (step 221). Next, the file name is entered (step 222). Then, it is checked whether or not the entered filed name is correct (step 223). If the result at this step is negative, an error message is outputted (step 224) and the process ends. Adversely, if the result at step 223 is affirmative, the relative reading dot density and dictionary type is read out from the HDD 17 and displayed (step 225). Then, when printing means for outputting the list is designated (steps 225 and 226), the file is made open and the table is read out and transferred in the RAM (step 227). Then, when the CRT unit 13 is designated, the list is displayed (steps 228 and 229). When the printer 13 is designated, the list is printed out (steps 230 and 231). Then, the file is closed (step 232).

A description is given on the utility of "creation and maintenance of multi-font dictionary" (process 155 in FIG. 10).

This utility couples the respective font dictionaries with each other by assigning the priority thereto and intends to automatically find the optimum font dictionary even without the designation of the font. This utility contains the following sub-modes: "registration of multi-font file name" (process 244), "registration of font dictionary file name" (process 245), "deletion of font dictionary file name" (process 246), "print out of list of characters registered in font dictionary file name" (process 247), "addition of font dictionary file name" (process 248), and "interchange of font dictionary file name" (process 249).

Figure 16:
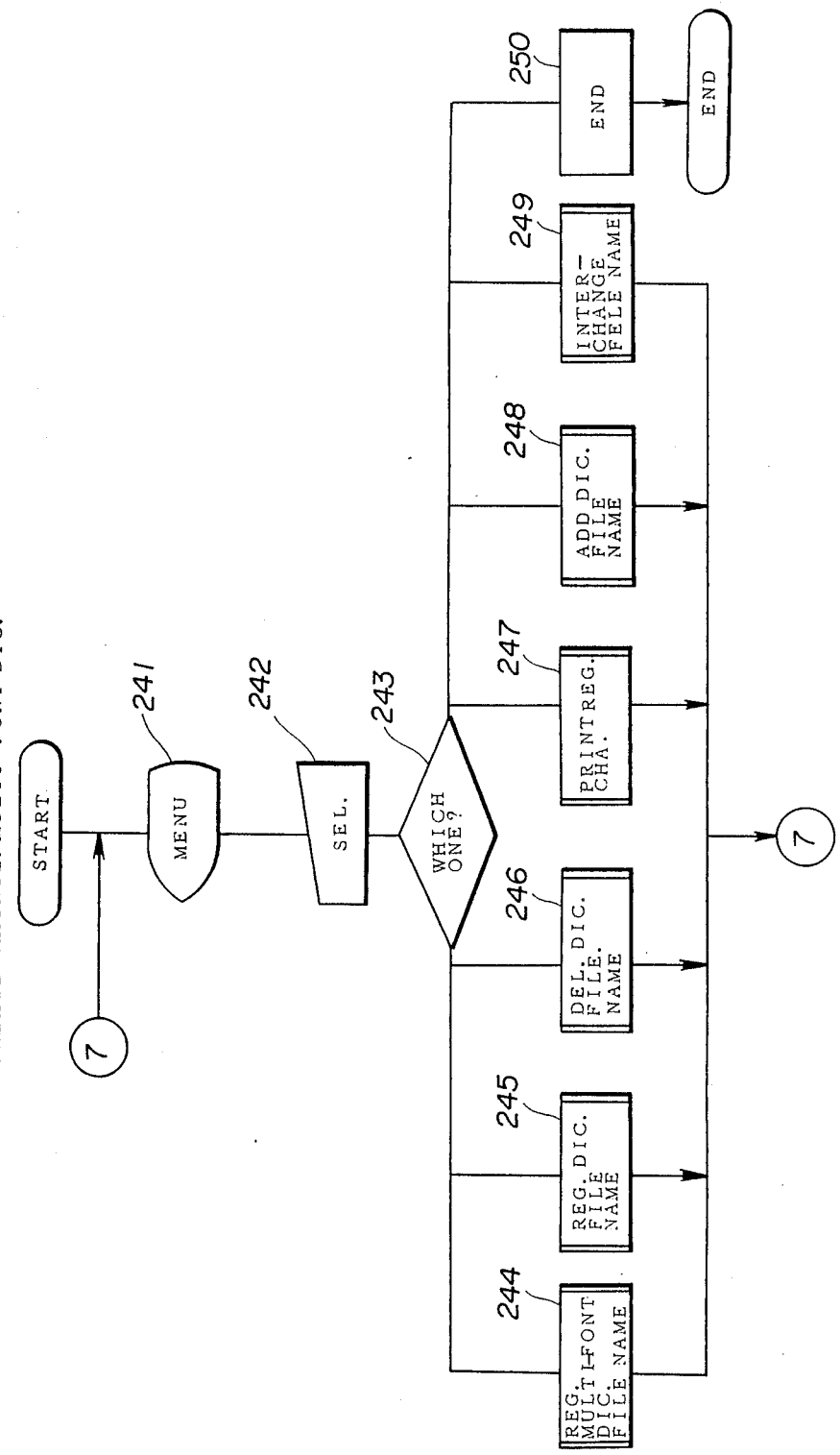
FIG. 16 is a flow chart showing a process for creation and maintenance of a multi-font dictionary.
Figure 17:
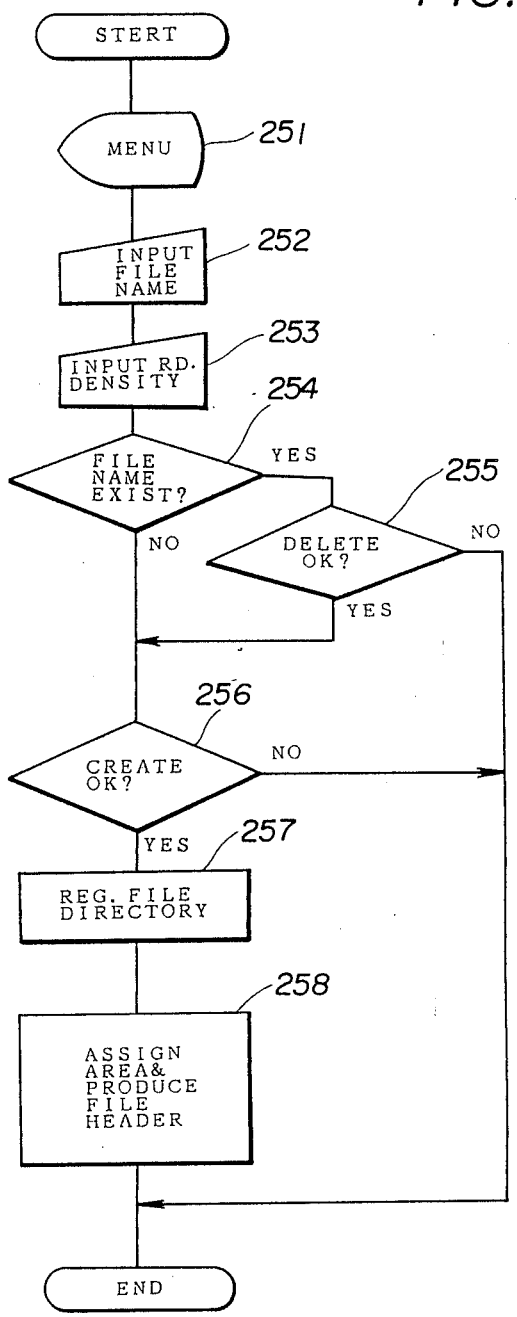
FIG. 17 is a flow chart showing a process for registration of a multi-font dictionary file name.

FIG. 17 is a flow chart of process 244 in FIG. 16.

Referring to this figure, a menu for registration of the multi-font file name is displayed (step 251). Next, the multi-font file name which the operator wants to register is entered (step 252). Then, the reading dot density is entered (step 253). Thereafter, it is checked whether or not the inputted file name exists in the HDD 17 (step 254). If the result at step 254 is affirmative, subsequently it is checked whether or not the multi-font file name which is already provided in the HDD 17 is permitted to be deleted (step 255). If not permitted, the process ends. Adversely, if the deletion is permitted, it is further checked whether or not the registration of the multi-font file name is permitted (step 256). If the discrimination result is affirmative, the entered multi-font name is registered in the file directory (step 257). Then, an area in the file is assigned and a file header is made (step 258).

Figure 18:
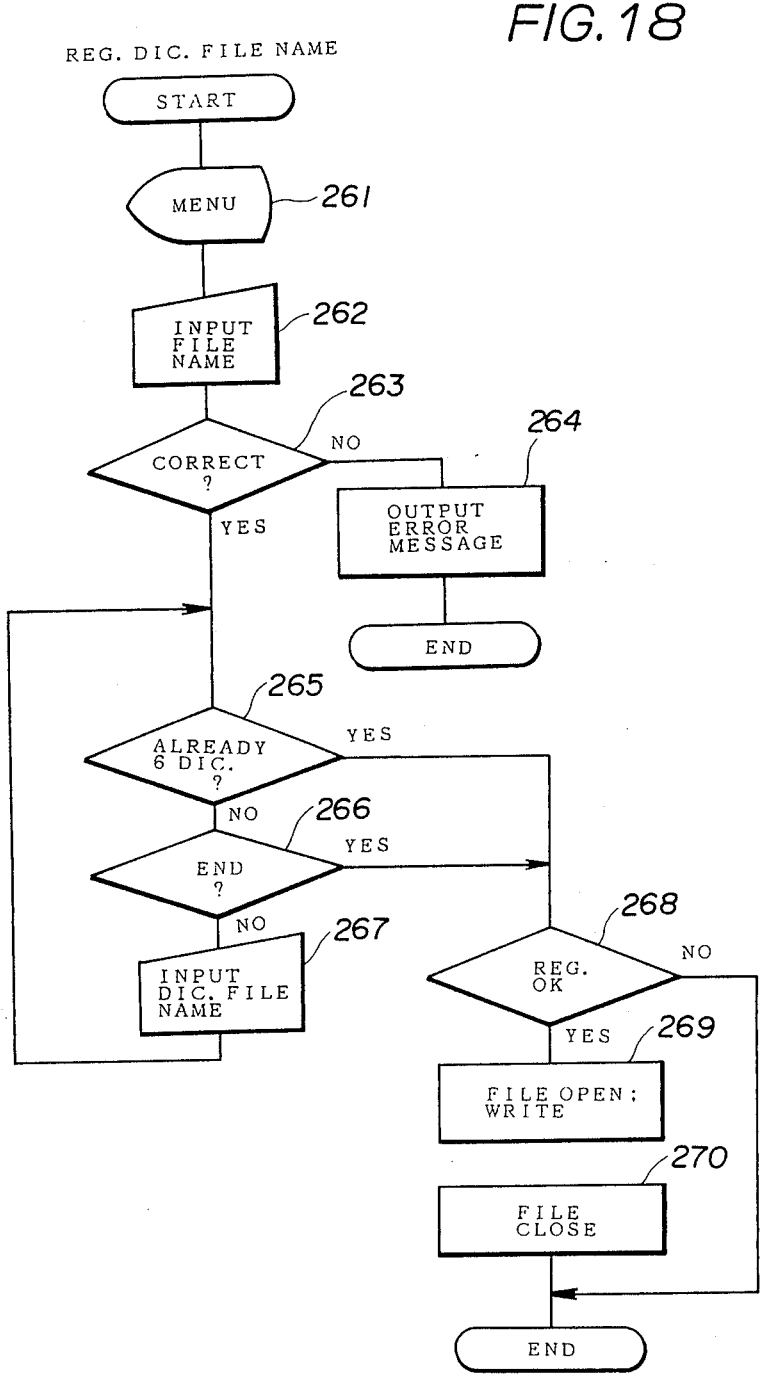
FIG. 18 is a flow chart showing a process for registration of a font dictionary file name.

FIG. 18 is a flow chart of the process 245 (FIG. 16) for the registration of the file name of the font dictionary constituting multi-font dictionary. After a menu is displayed (step 261), the font dictionary file name is entered and checked as to whether or not that file name is correct (steps 262 and 263). If the discrimination result is affirmative, the process proceeds to step 265. In this example, the registration of a maximum of 6 font dictionaries is allowed to form the multi-font dictionary. Therefore, a maximum of 6 font dictionaries may be registered in accordance with a seqwuence of steps 265, 266 and 267. Thereafter, the confirmation is made (step 268). If confirmed, the multi-font dictionary file is made open and the file name entered at step 267 is registered (step 269). Then, the file is closed (step 270).

Figure 19:
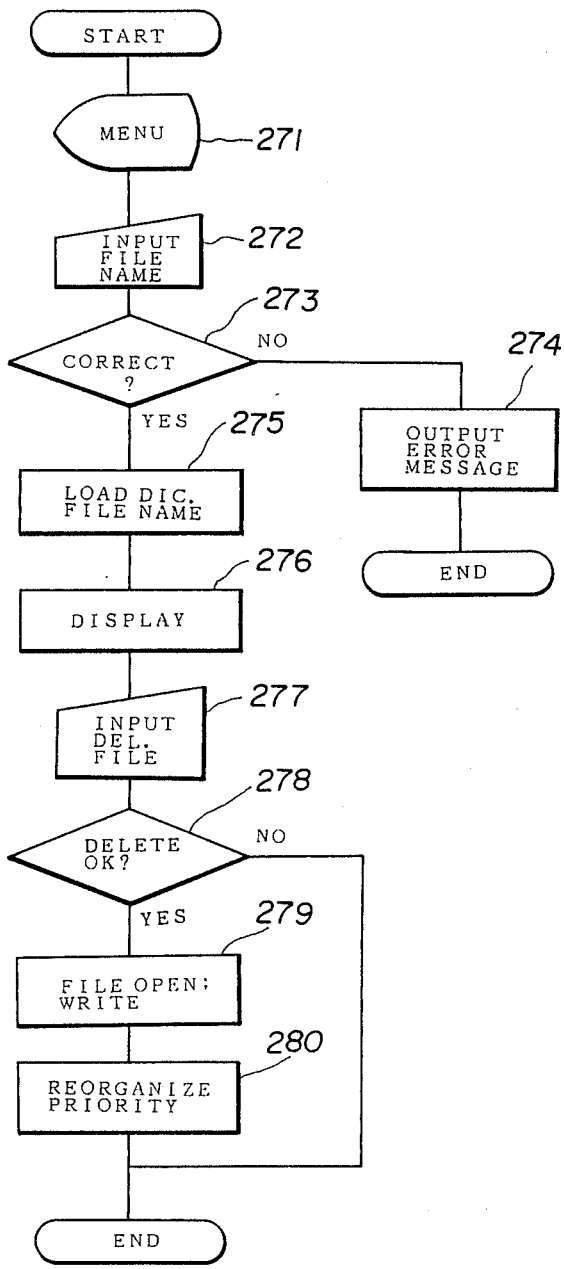
FIG. 19 is a flow chart showing a process for deletion of a font dictionary name.

FIG. 19 is a flow chart of the process 246 (FIG. 16) for deleting the font dictionary file name from the multi-font dictionary file. A menu of this process is displayed and the font dictionary file name to be deleted is entered and checked as to whether or not it is correct (steps 271 to 273). If the entered file name is erroneous, an error message is outputted (step 274). Adversely, if the file name is correct, the font dictionary file names read out from the HDD 17 is written in the RAM 22 and displayed (steps 275 and 276). Then, the font dictionary file name to be deleted is designated (step 277). This designation is confirmed at step 278, and if the deletion is permitted, the font dictionary file name is deleted (step 279). Thereafter, the priority of the font dictionaries is reorganized (step 280). At this time, the priority of the dictionaries which is less than the priority of the deleted dictionary is advanced.

Figure 20:
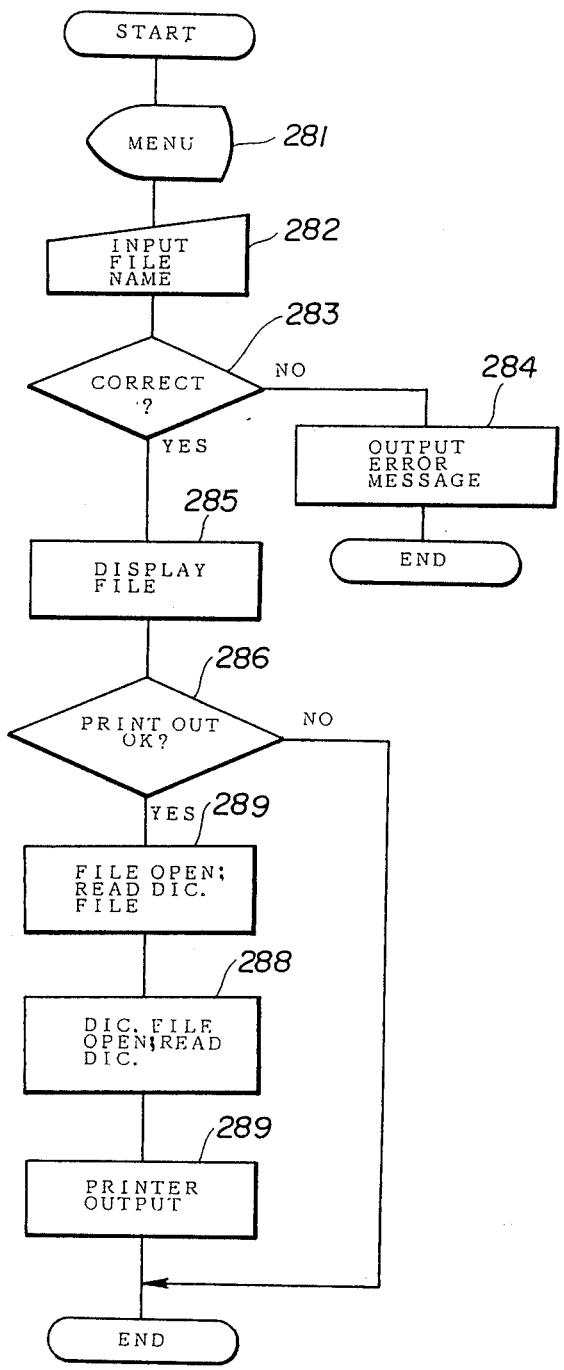
FIG. 20 is a flow chart showing a process for printing out registered characters in a font dictionary forming the multi-font dictionary.

FIG. 20 is a flow chart of the process 247 (FIG. 16) for printing out the list of the characters registered in the font dictionary file. A menu of this process is displayed and the multi-font dictionary file name is entered (steps 281 and 282). The entered file name is checked whether or not it is correct (step 283). If the file name if erroneous, an error message is outputted (step 284). Adversely, if correct, the designated font dictionary file is displayed (step 285). Then, if the printing out is instructed (step 286), the designated font dictionary file is made open and transferred to the RAM 22 (step 227). Then, the table in the file is read out and the characters registered in the table are printed out (steps 288 and 289).

Figure 21:
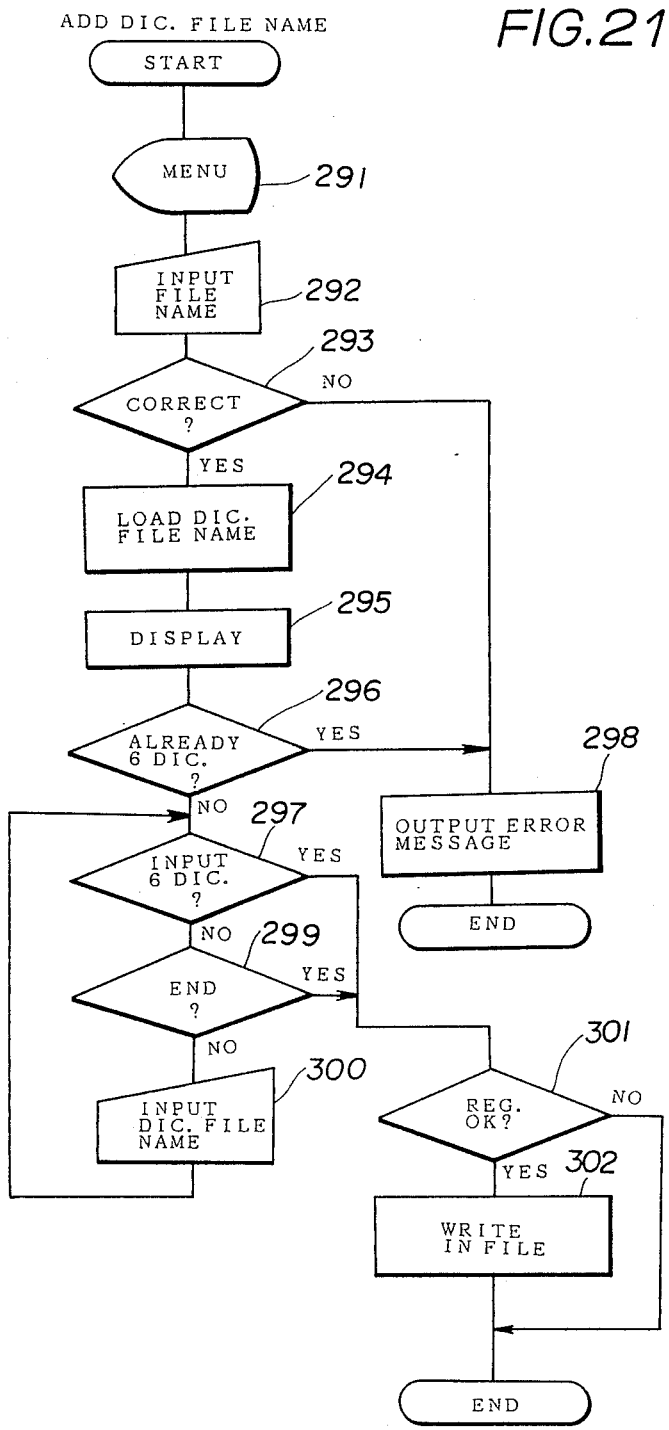
FIG. 21 is a flow chart showing a process for addition of a font dictionary to the multi-font dictionary.

FIG. 21 is a flow chart of the process 248 (FIG. 16) for adding the font dictionary file name into the multi-font dictionary. A menu fo this process is displayed and the multi-font dictionary file name is entered and checked (steps 291 to 293). If the entered file name is correct (step 293), all of the font dictionary file relating to the multi-font dictionary file name designated at step 292 are loaded and displayed (steps 294 and 295). As described before, in this embodiment, it is possible to register a maximum of six font dictionary files to constitute one multi-font dictionary. Therefore, if six font dicitonaries are already registered (step 296), the process ends. Alternatively, if the number of the font dictionaries is less than six, it is posssible to add the font dictionary name in accordance with a sequence of steps 297 to 300. Then, if the registration of the entered font dictionary file name is permitted (step 301), the file name is written in the multi-font dictionary file (step 302).

Figure 22:
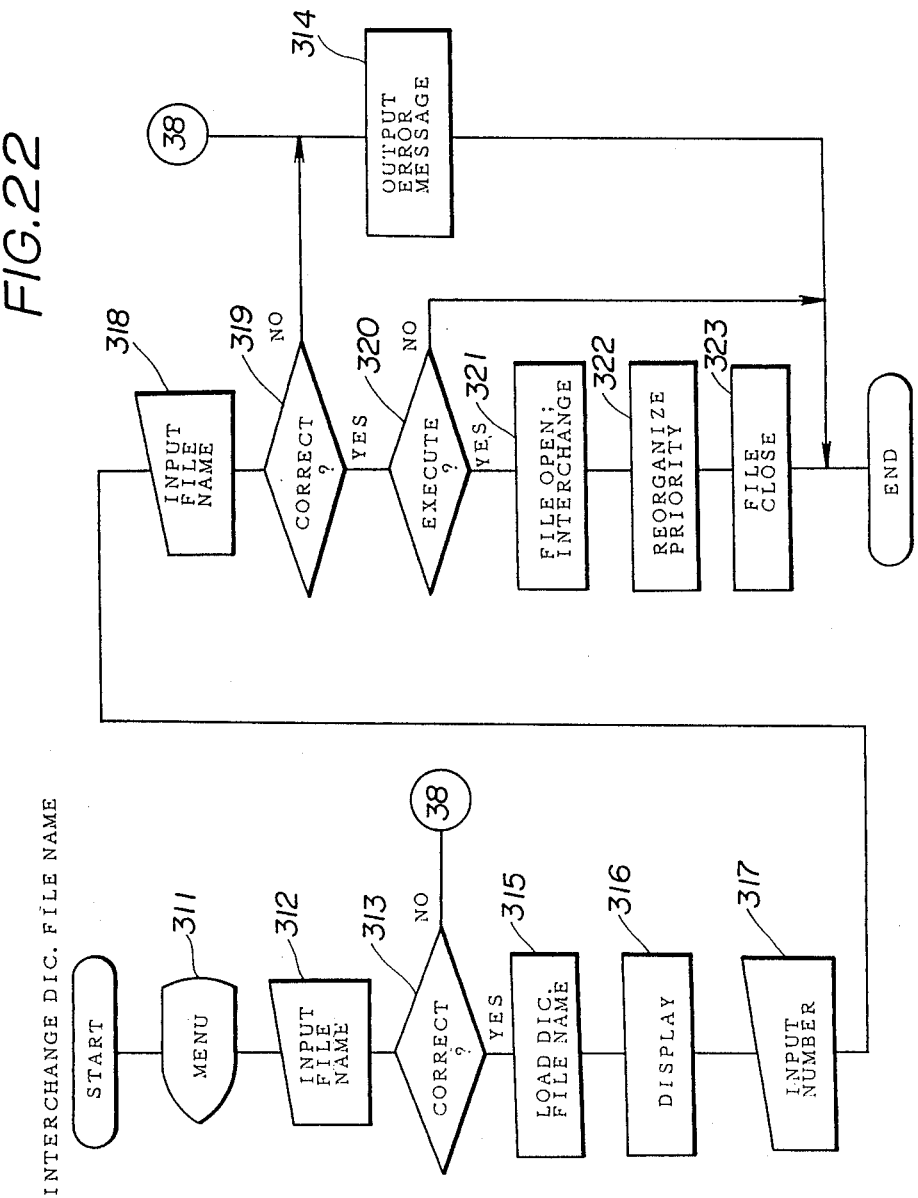
FIG. 22 is a flow chart showing a process for interchanging the dictionary file name.

FIG. 22 is a flow chart of the process 249 (FIG. 16) for interchanging the font dictionary file names with each other. A menu of this process is displayed and the multi-font dictionary file name is entered (steps 311 and 312). If the entered file name is correct (step 313), all of the font dictionary file names relating to the multi-font dictionary file designated at step 312 are loaded form the HDD 17 and displayed (steps 315 and 316). Then, the file numbers to be interchanged with each other are entered (step 317), and the font dictionary file names to be interchanged with each other are entered (step 318). If these designations are correct (step 319) and the execution of the interchange is instructed (step 320), the designated multi-font dictionary files are made open and the dictionary file names are interchanged (step 321).

Thereafter, the priority of all the font dictionaries are reorganized (step 322) and the multi-font dictionary file is closed (step 323).

Figure 23:
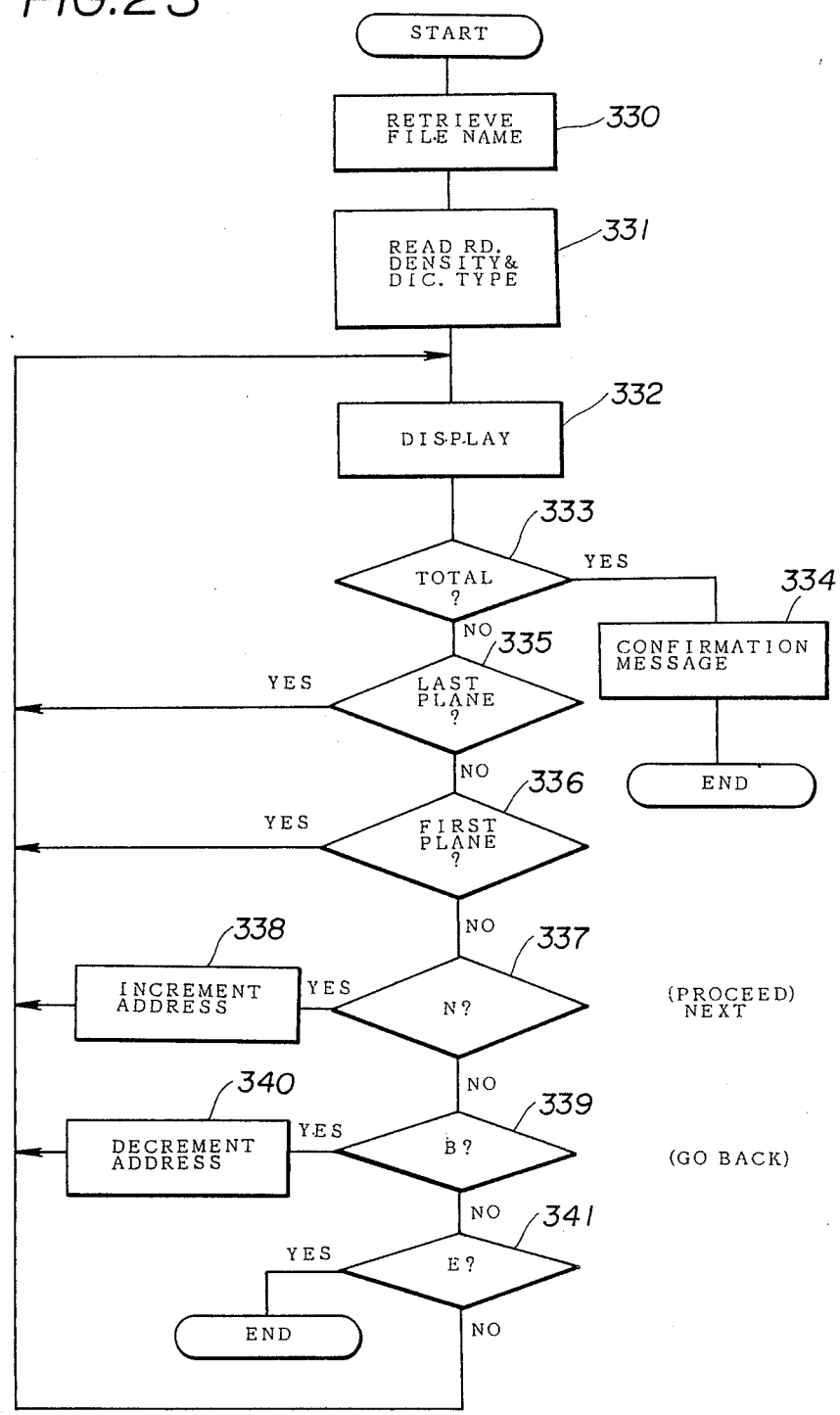
FIG. 23 is a flow chart showing a process for displaying a dictionary file list.

A description will be given on the utility of "display of list of dictionary file names" (process 156 in FIG. 10) with reference to FIG. 23. This utility is used to display the list of the dictionary file names stored in the HDD 17. Firstly, all of the dictionary file names are retrieved (step 330). Then, the reading dot density and the dictionary type of each dictionaries are read out (step 331) and displayed together with the dictionary file names (step 331). In this example, a maximum of eight dictionary file names may be displayed on a display plane. If the total number of all the registered dictionary files is eight or more (step 333), a confirmation message for asking the operator whether or not this is correct (step 334). Adversely, if the total number is less than eight at step 33, it is checked whether or not the current display plane is the last one (step 335). If the discrimination result is affirmative, the process returns to step 332. To the contrary, if not, it is checked whether or not the current display plane is the first one (step 336). If the result is affirmative, the process returns to step 332. Adversely, if the result at step 336 is negative, the process proceeds to step 338. At this step, if the operator wishes to see the next display plane, the address which indicates the position at which the dictionary file names are registered is incremented by the operation of an N (next) key on the keyboard 11 (step 338), and the next display plane is displayed. On the other hand, if the operator wishes to go back to the previous display plane, the process proceeds to step 340 by the operation of a B (back) key on the keyboard 11 (step 339). At step 340, the address is decremented and the process returns to step 332, so that the previous display plane is displayed. If the operator wishes to end this process, an E (end) key on the keyboard 11 is operated.

A description will be given on utilities for creation and maintenance of handwritten character dictionary.

FIG. 24 is a flow chart for selecting one of the utilities. When the creation and maintenance of handwritten character dictionary is designated, a menu of this process is displayed (step 350). Then the operator selects one of the displayed utilities (step 351). The system discriminates the designated utility (step 352) and executes the discriminated utility. In this embodiment, there are provided four utilities; "registration of file name" (process 353), "registration and addition of character" (process 354), "deletion of character" (process 355), and "print out of list of registered character" (process 356).

First of all, an explanation of the registration of a name of a handwritten character dictionary file by referring to FIG. 25. A menu of this process is displayed (step 360) and a file name of a handwritten character dictionary which the operator wishes to register is entered (step 361). Then, the reading dot density relating to this dictionary file is entered (step 362). Thereafter, it is checked whether or not the designated file name exists (step 363). If the discrimination result is negative, it is further checked whether or not deletion of the existing file name is permitted (step 364). If the result is affirmative, it is checked whether or not the creation of the handwritten dictionary file is permitted (step 365). If the result is affirmative, the designated file name is registered in the directory of the file (step 366). Then an area in the HDD 17 is assigned to constitute the file, and a file header for storing control information such as a file number and a file name is created (step 367).

Figure 26B:
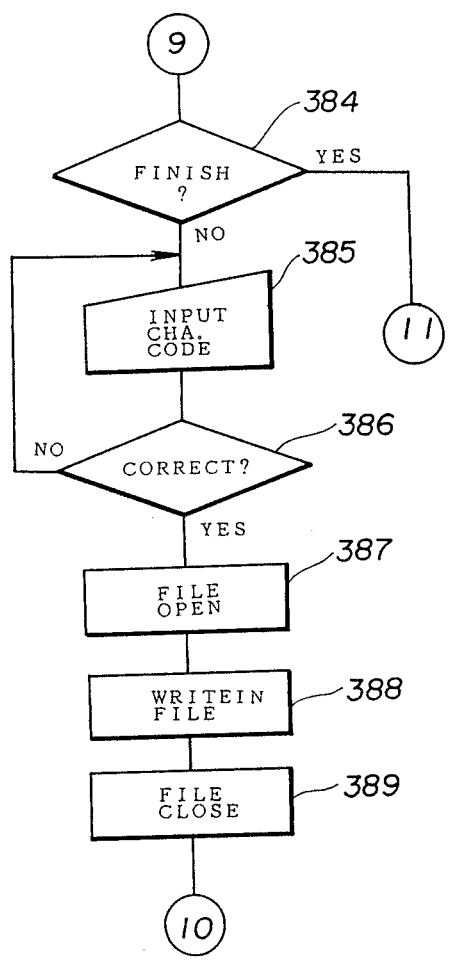

FIGS. 26A and 26B are flow charts of the process 354 (FIG. 24) for the registration and addition of a character. A menu is displayed depending on the instructions of registration or addition (steps 370 to 372). Then, a file name of a handwritten character dictionary file in which the operator wishes to register or add the desired character is entered (step 373) and checked as to whether or not it is correct (step 374). If the entered file name is erreneous, an error message is outputted (step 375). Adversely, if correct, the reading dot density relating to the designated file is read out and displayed (step 376). Thereafter, the number of the aligned handwritten characters which are characters on the document to be added or registered is entered through the keyboard 11. Subsequently, the reading tone of the aligned handwritten characters is entered (step 378). Furthermore, the kind of the handwritten character (mumeric character, alphabetic character and so on) is inputted (step 379). Thereafter, it is checked whether or not the adding or registering operation is instructed (step 380). If the discrimination result is affirmative, the document on which the aligned handwritten characters are provided is held in place (step 381) and the reading starts (step 382). Then it is checked whether or not the scanner 12 is in time-out (step 383). If the discrimination result is affirmative, it is checked whether or not the process should be continued (step 390). If the result at this step is negative, the process ends. Adversely, if the result is affirmative, the process returns to step 381 and the sequence of steps 381 to 383 is repeated. On the other hand, if the result at step 383 is negative, it is checked whether or not the reading operation has ended (step 384). If the result at this step is affirmative, the process proceeds to the step 390. Alternatively, if the result at step 384 is negative, the corresponding character is entered through the keyboard 11. At this time, the dot pattern which is produced in accordance with the image processing is displayed. Instead, the dot pattern of any one of the aligned characters may be displayed. Then if the entered character is confirmed to be correct (step 386), the handwritten character dictionary file is made open (step 387), and the image data (dot pattern) produced by the image processing are written together with the character code entered at step 385 in the file (step 388). Finally, the file is closed (step 389).

FIG. 27 is a flow chart of the process 355 (FIG. 24) for deleting the character registered in the handwritten character dictionary file. A menu of this process is displayed (step 391) and the file name of the handwritten character dictionary in which the character to be deleted is registered is entered (step 392). Then, it is checked whether or not the entered file name is correct (step 395). If the discrimination result is affirmative, the reading dot density relating to the designated dictionary file is displayed (step 395). Then, the character to be deleted is entered through the keyboard 11 (step 396). Subsequently, it is checked whether or not the entered character exists in the dictionary file. If the discrimination result is affiramative, the kind of the character to be deleted is entered (step 399). Then it is checked whether or not the deletion is permitted (step 400). If the deletion is permitted, the deleting operation is carried out in accordance with a sequence of steps 402 to 406. In this example, a maximum of 128 characters may be registered in the handwritten character dictionary. Firstly, it is checked whether or not the character which is read from the dictionary file transferred into the RAM 22 is the last one (step 402). If the character is not the last one, it is checked whether or not the current characters coincides with the character to be deleted (step 404). If the result is affirmative, it is further checked whether or not the kind of the current character coincides with the kind of the character to be deleted (step 404). If the result is affirmative, the current character is deleted (step 405). Then, the next character is read out from the RAM 22 (step 406). In this manner, all of the characters are sequentially read out and when the character to be deleted are found, it is deleted. Finally, the content of the RAM 22 is written in the file in the HDD 17 (step 407) and the file is closed (step 408).

FIG. 28 is a flow chart of the process 356 (FIG. 24) for printing out the list of the registered characters. A menu of this process is displayed (step 411) and the file name of the handwritten character dictionary is entered (step 412). Then it is checked whether or not the entered file name is correct (step 413). If the discrimination result is affirmative, the process proceeds to steps 415 and 416 at which the designation of the output means is detected. Then, the dictionary file is made open and the character table is read out from the HDD 17 and transferred into to RAM 22 (step 417). Thereafter, if the CRT 13 is designed as the outputting means (step 418), the list of the registtered characters is displayed (step 419). If the printer 14 is designated as the outputting means (step 420), the list of the registered characters is printed (step 421). Then, the dictionary file is closed (step 422).

A description will be given on essential parts of a dictionary creating method of the present invention. According to the present invention, it is possible to create not only the font dictionary for recognizing the type character having the particular font but also the handwritten character dictionary for recognizing the handwritten character.

Figure 29:
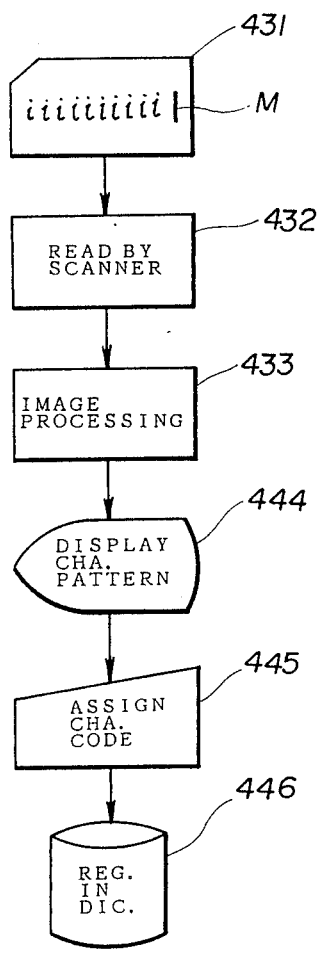
FIG. 29 is a flow chart showing a general process for a method of creating a dictionary according to the present invention.

FIG. 29 is a flow chart showing a general sequence of the dictionary creating method of the present invention. Referring to this figure, at step 431, a document is prepared on which a plurality of the same characters are aligned. In this example, small letters "i" are aligned in the main (transverse) direction. This small character "i" is a character which is to be registered in the dictionary. In the vicinity of a line end, there is provided a mark M for defining a size of one character line. The mark M will be described in more detail later. Next, the scanner 12 begins scanning the document. Then, image data within the range defined by the mark M are extracted. That is, image data outside the above image is not extracted. Thereafter, an image processing is carried out for the dot pattern formed by the image data of each character to produce one dot pattern which is to be registered in the dictionary. The image processing will be described in detail later. Thereafter, the produced dot pattern of the character "i" is displayed. Instead, it is also possible to display the image data of any one of the characters on the document. Then, the operator enters a character corresponding to the displayed character dot pattern (in this case, the charecter "i") through the keyboard 11. Thereby, a character code corresponding to the entered character is produced (step 445). This character code is registered in the dictionary together with the dot pattern produced by the image processing (step 446).

A more detailed explanation of the dictionary creating method is described with reference to FIGS. 30 through 33.

As described above, at the commencement of the registration process of the character, the document is scanned on which the identical characters are aligned in the main direction. The image data is successively stored in the RAM 22. Then, the horizontal projection is carried out for the stored image data.

Figure 30:
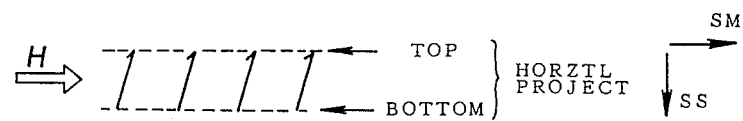
FIG. 30 is a view for explaining a conventional horizontal projection method.

Now, in order to ensure the better understanding of the mark M, the conventional horizontal projection is described referring to FIG. 30. Firstly, as shown by an arrow H, aligned characters on the document are observed from the start point of the main direction towards the end thereof. Then, a first position at which the level (data) of a dot is changed from white to black is detected. Subsequently, a second position at which the level is changed from black to white is detected. Then, an area between the first and second point is decided as a size (width) of one character line (or a size of the horizontal projection). The first point corresponds to the top of the line, and the second point corresponds to the bottom of the line. The image data between the top and bottom lines is extracted for the matching.

In general, the above horizontal projection cannot find one character line correctly. For example, a character composed of separate parts (for example, character "i" or "j") is detected as two independent characters. For this reason, even when the second position is detected, it is not immediately concluded to be the bottom of the line. That is, even when the second point is detected, the scanning of the characters is continued within a predetermined range. At this time, if a point at which the level is changed from white to black is detected, it is found that this point corresponds to the bottom of the character line. This manner of detecting the bottom of the line is also effective for blurred characters.

However, there is a possibility that if characters are small and adjacent characters in the sub-scanning scanning direction are close, these characters are detected as one character.

Figure 31:
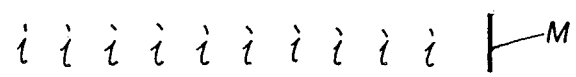
FIG. 31 is a view for explaining an extraction method of one character line.

In order to eliminate this problem, according to the present invention, as shown in FIG. 31, the mark M is provided in the vicinity of the last character of the characters aligned in the main direction. The mark is like a bar extending in the sub-scanning scanning direction. The height of the mark M must be greater than that of the characters. As mentioned before, the mark M is used to indicate the size (width) of the character line to be extracted. At the time of the scanning, when the top of the mark M is detected, this top is designated as the top of the line, and when the bottom of the mark M is detected, this bottom is designated as the bottom of the line. Thus, it is possible to correctly extract the characters even if the characters are small and very close to each other or the characters are blurred. The mark M may be positioned in the vicinity of the first character of the line.

It should be appreciated that the mark M is particularly effective with the handwritten characters. For example, even where a peculiar handwritten character such that a "point part" of character "i" is considerably away from the main part thereof, it is possible to extract the character "i" as one character. Preferably, the width of the mark M which is measured in the main direction corresponds to several dots in order to eliminate the influence resulting from noise or dust on the sheet.

The process for registering the character in the dictionary is explained in more detail with reference with FIG. 32.

Figure 32:
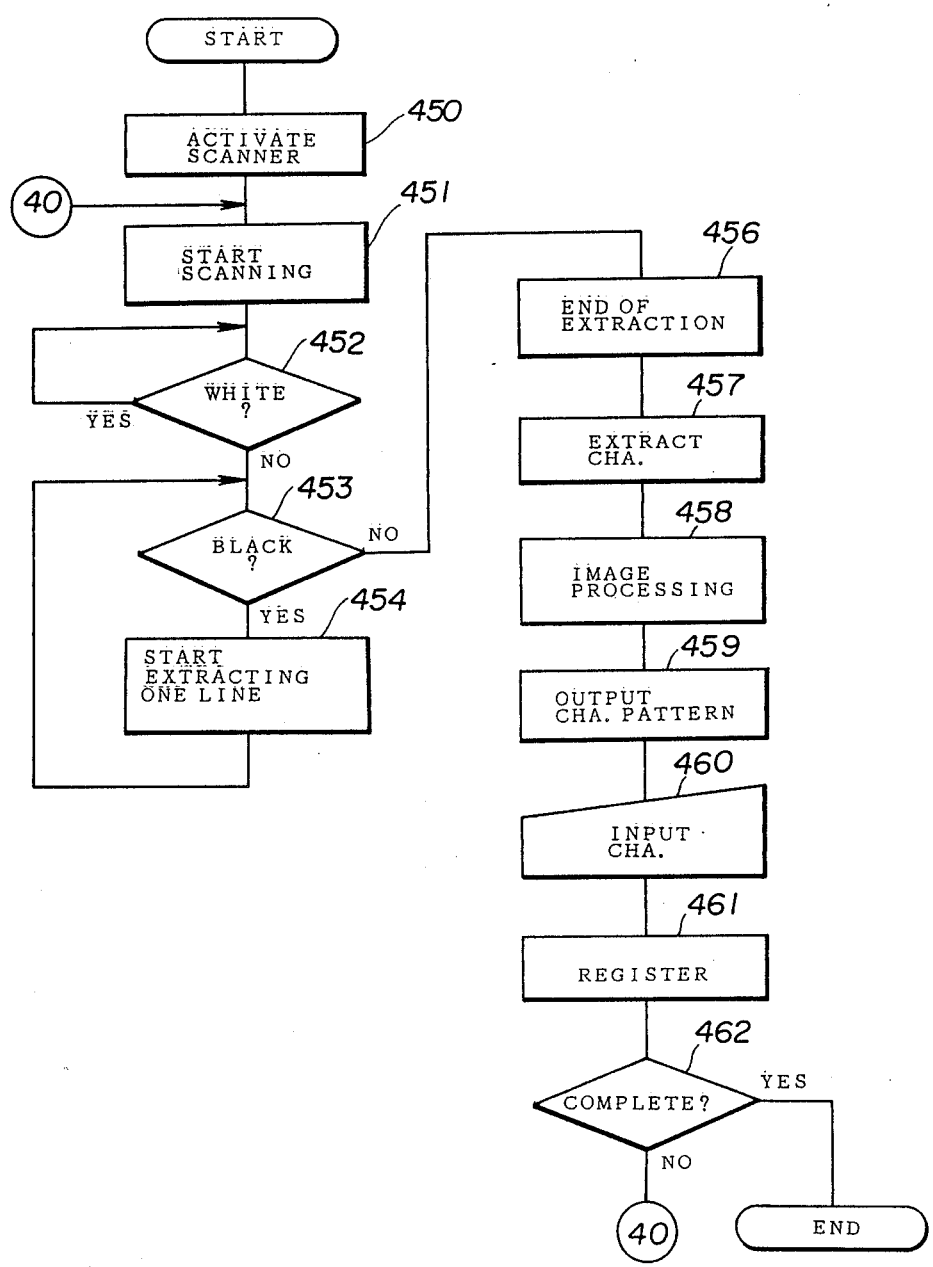
FIG. 32 is a flow chart of a detailed process for creating a dictionary according to the present invention.

Firstly, the document as shown in FIG. 31 is held in place (step 450 in FIG. 32). In the illustrated example, 10 identical characters "i" are aligned. After activating the scanning, the scanning is started (step 451). In the scanning, as long as the predetermined number of consecutive dots of black level along one scanning line is not found, the extraction of the image data is not carried out. In other words, the scanner 12 continues to scan a space part on the document (step 452). Thereafter, when the predetermined number of consecutive dots of black level is detected in a scanning line (step 453), it is recognized that the top of the mark M is detected, and the extraction of image data starts (step 454). The extraction of the image data is continued as long as the mark M is detected. Thereafter, when the discrimination result at step 453 becomes negative, the extraction of the image data is terminated (step 456). Thereby, the image data corresponding to one character line is extracted.

Subsequent to step 456, the extraction of each of the characters included in the extracted character line is started (step 457). For the example shown in FIG. 31, each of ten characters is sequentially extracted. Thereby, the dot pattern data of each of the extracted characters (character dot pattern) is obtained.

Thereafter, when the character to be registered is the type character, the process directly proceeds to step 458. On the other hand, when the character to be registered is the handwritten character, the conventional smoothing process and the conventional normalization process are carried out for the dot pattern data of each of the extracted characters. The smoothing process intends to compensate a rough contour of the dot pattern of the handwritten character. The normalization process intends to make the size of the dot patterns of the handwritten character uniform.

Then, an image processing is carried out for the extracted dot pattern data in order to produce one dot pattern data (step 458). For example, an OR logic operation is carried out for data "1" for black and "0" for white) at the same dot position in the extracted dot patterns. In the example shown in FIG. 31, a datum at the same dot position is extracted from each of the 10 character dot patterns. Then, the OR logic operation is carried out for the extracted 10 data. If all of the 10 data are "0 (white level), the data at this dot position is decided to be "0". If at least data "1"is contained in the 10 data, the data at this dot position is decided to be "1". In this manner, the OR logic operation is carried out for each dot position.

In place of the OR operation, an AND logic operation may be applied to data of the corresponding dots of the character dot patterns. The OR logic operation is suitable for processing the dot pattern of the type character. This is because the type character has a peculiar font and there is substantially no difference between the printed identical character in light of size, a width of a line forming the character and so on. Of course, the OR logic operation may be applied to the handwritten character. The AND operation is suitable for the case where the registered character is the handwritten character. This is because there is a possibility of there being a considerable difference between the identical handwritten characters.

Moreover, an averaging operation may be used together with the OR logic operation. That is, a number of data of the black level at the same dot position of the extracted dot patterns is counted. Then, when the number of black level data is less than a predetermined number, the level of that point is considered to be white level. This operation is carried out for each dot position. This averaging operation makes it possible to eliminate the influence of noise or dust.

Figure 33:
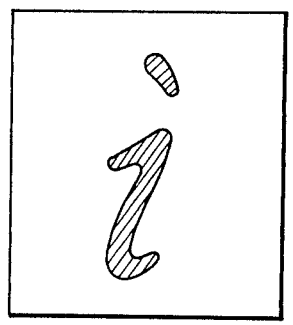
FIG. 33 is a view showing an image data to be registered in a dictionary.

Then, the character pattern thus produced is displayed ont he CRT unit 13, for example, as shown in FIG. 33. Instead, it is also possible to display any one of the extracted character patterns obtained at step 457.

The operator sees the character pattern on the CRT unit 13 and enters the corresponding character through the keyboard 11 (step 460). In the above example, the character "i" is entered. Thereby, the corresponding character code data is produced and registered together with the constituted character dot patterns in the dictionary file in the HDD.

According to the present invention, it becomes possible to easily register not only the type character but also the handwritten character having a peculiar writing style. The number of the aligned identical characters are preferably around 10. Of course, as the number of the aligned identical character increases, the dictionary becomes more accurate. However, a time for processing the characters increases with an increase as the number of the characters increases. For this reason, around 10 characters are suitable.

The present invention is not limited to the embodiments described above, but various variations and modifications may be made without departing the scope of the present invention.

What is claimed is:

1. A method of creating a dictionary for character recognition, comprising the steps of:
   optically scanning a sheet having a character line having a plurality of identical characters aligned in a scanning direction, a mark defining a size of said character line being provided in the vicinity of said character line;
   generating image data of each of said identical characters within said character line having the size defined by said mark, said image data of each of said identical characters forming an individual dot pattern;
   carrying out a predetermined image processing for said individual dot patterns of said identical characters to thereby generate a single dot pattern serving as a reference dot pattern of said identical characters;
   inputting a character code corresponding to said single dot pattern; and
   registering said single dot pattern and said character code in a storage region of a dictionary file for character recognition.

2. A method of creating a dictionary for character recognition as claimed in claim 1, wherein said mark is a bar extending in a direction perpendicular to said scanning direction and a height of said mark is greater than that of said identical characters measured in said direction perpendicular to said scanning direction.

3. A method of creating a dictionary for character recognition as claimed in claim 2, wherein a width of said mark includes a plurality of consecutive black dots.

4. A method of creating a dictionary for character recognition as claimed in claim 1, wherein said predetermined image processing includes a step of carrying out an OR logic operation on said image data of said identical characters located at an identical dot position in said individual dot patterns, and wherein the result of said OR logic operation forms data at said identical dot position of said single dot pattern registered in said dictionary file.

5. A method of creating a dictionary for character recognition as claimed in claim 4, wherein said predetermined image processing includes steps of counting the number of data having a black level among said image data located at said identical dot position of said individual dot patterns, carrying out an OR logic operation on said image data located at said identical dot position in said individual dot patterns, determining whether said counted number of data is smaller than a predetermined number of data, and deciding the level of data at said idenical dot position to be white irrespective of the result of said OR logic operation.

6. A method of creating a dictionary for character recognition as claimed in claim 1, wherein said predetermined image processing includes a step of carrying out an AND logic operation on said image data of said identical characters located at an identical dot position in said individual dot patterns, and wherein the result of said AND logic operation forms data at said identical dot position of said single dot pattern registered in said dictionary file.

7. A method of creating a dictionary for character recognition as claimed in claim 1, further comprising a step of displaying said single dot pattern registered in said dictionary file on a display device.

8. A method of creating a dictionary for character recognition as claimed in claim 1, further comprising a step of displaying any one of said individual dot patterns.

9. A method of creating a dictionary for character recognition as claimed in claim 1, wherein said identical characters are typed characters.

10. A method of creating a dictionary for character recognition as claimed in claim 1, wherein said identical characters are handwritten characters.

11. A method of creating a dictionary for character recognition as claimed in claim 4, wherein said OR logic operation corresponding to said image processing is carried out when said identical characters are typed characters or handwritten characters.

12. A method of creating a dictionary for character recognition as claimed in claim 6, wherein said AND logic operation corresponding to said predetermined image processing is carried out when said identical characters are handwritten characters.

13. A method of creating a dictionary for character recognition as claimed in claim 5, wherein said OR logic operation corresponding to said image processing is carried out when said identical characters are handwritten characters.

14. A method of creating a dictionary for character recognition as claimed in claim 1, further comprising a step of smoothing said individual dot patterns before carrying said predetermined image processing.

15. A method of creating a dictionary for character recognition as claimed in claim 1, further comprising a step of normalizing said individual dot patterns before carrying out said predetermined image processing.

16. A method of creating a dictionary for character recognition as claimed in claim 1, wherein said step of inputting said character code is performed by a keyboard.

17. A method of creating a dictionary for character recognition as claimed in claim 1, wherein the number of said identical characters is about ten.

18. A method of creating a dictionary for character recognition as claimed in claim 1, wherein said dictionary file is created for each character font.

19. A method of creating a dictionary for character recognition as claimed in claim 1, wherein said mark is positioned in the vicinity of one of said identical characters which is located at the beginning or end of said character line.

* * * * *